US009825711B1

(12) United States Patent
Agazzi et al.

(10) Patent No.: US 9,825,711 B1
(45) Date of Patent: *Nov. 21, 2017

(54) HIGH-SPEED OPTICAL COMMUNICATIONS SYSTEM

(71) Applicant: Inphi Corporation, Santa Clara, CA (US)

(72) Inventors: Oscar Ernesto Agazzi, Irvine, CA (US); Diego Ernesto Crivelli, Cordoba (AR); Hugo Santiago Carrer, Mendiolaza (AR); Mario Rafael Hueda, Cordoba (AR); Martin Ignacio del Barco, Cordoba (AR); Pablo Gianni, Cordoba (AR); Ariel Pola, Cordoba (AR); Elvio Adrian Serrano, Cordoba (AR); Alfredo Javier Taddei, Cordoba (AR); Mario Alejandro Castrillon, Cordoba (AR); Martin Serra, Cordoba (AR); Ramiro Matteoda, Cordoba (AR)

(73) Assignee: INPHI CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/205,929

(22) Filed: Jul. 8, 2016

Related U.S. Application Data

(63) Continuation of application No. 14/311,019, filed on Jun. 20, 2014, now Pat. No. 9,391,715, which is a continuation of application No. 12/938,040, filed on Nov. 2, 2010, now Pat. No. 8,761,609.

(60) Provisional application No. 61/257,384, filed on Nov. 2, 2009.

(51) Int. Cl.
| | |
|---|---|
| *H04B 10/00* | (2013.01) |
| *H04B 10/61* | (2013.01) |
| *H04L 7/00* | (2006.01) |
| *H04L 27/01* | (2006.01) |
| *H04J 14/00* | (2006.01) |

(52) U.S. Cl.
CPC ....... *H04B 10/6161* (2013.01); *H04L 7/0075* (2013.01); *H04L 27/01* (2013.01)

(58) Field of Classification Search
CPC .............. H04B 10/616; H04B 10/6161; H04B 10/6162; H04B 10/6164; H04B 10/69
See application file for complete search history.

(56) References Cited

U.S. PATENT DOCUMENTS

| 7,606,498 | B1 | 10/2009 | Wu et al. | |
|---|---|---|---|---|
| 7,769,305 | B1* | 8/2010 | Roberts | H04B 10/60 398/152 |
| 8,761,609 | B1* | 6/2014 | Agazzi | H04B 10/616 398/155 |
| 9,391,715 | B1* | 7/2016 | Agazzi | H04B 10/616 |
| 2001/0035994 | A1 | 11/2001 | Agazzi et al. | |
| 2002/0012493 | A1 | 1/2002 | Newell et al. | |

(Continued)

OTHER PUBLICATIONS

Agazzi, O. et al., "Timing Recovery in Digital Subscriber Loops," IEEE Transactions on Communications, Jun. 1985, pp. 558-569, vol. COM-33, No. 6.

(Continued)

*Primary Examiner* — Daniel Dobson
(74) *Attorney, Agent, or Firm* — Richard T. Ogawa; Ogawa P.C.

(57) ABSTRACT

A receiver for fiber optic communications.

20 Claims, 43 Drawing Sheets

(56) References Cited

U.S. PATENT DOCUMENTS

| | | | |
|---|---|---|---|
| 2002/0196510 A1 | 12/2002 | Hietala et al. | |
| 2003/0035179 A1 | 2/2003 | May | |
| 2004/0037572 A1* | 2/2004 | Matsuyama | H04B 10/2572 398/208 |
| 2006/0013597 A1* | 1/2006 | Crivelli | H04B 10/6971 398/208 |
| 2007/0176814 A1 | 8/2007 | Grace | |
| 2009/0074428 A1 | 3/2009 | Liu | |
| 2009/0097860 A1 | 4/2009 | Papakos et al. | |
| 2009/0103926 A1 | 4/2009 | Hotchkiss et al. | |
| 2009/0169217 A1* | 7/2009 | Meagher | H04J 3/047 398/140 |
| 2009/0317073 A1 | 12/2009 | Hotchkiss et al. | |
| 2010/0092181 A1 | 4/2010 | Roberts et al. | |

OTHER PUBLICATIONS

Crivelli, D.E., et al., "Adaptive Digital Equalization in the Presence of Chromatic Dispersion, PMD, and Phase Noise in Coherent Fiber Optic Systems," IEEE 2004 Global Telecommunications Conference, Nov. 29-Dec. 3, 2004, vol. 4, pp. 2545-2551.

El-Chammas, M., et al., "A 12-GS/s 81-mW 5-bit Time-Interleaved Flash ADC With Background Timing Skew Calibration," IEEE Journal of Solid-Sate Circuits, vol. 46, No. 4, pp. 838-847, Apr. 2011.

Greshishchev, Y.M., et al., "A 40GS/s 6b ADC in 65nm CMOS," IEEE 2010 International Solid-State Circuits Conference Digest of Technical Papers, Feb. 7-11, 2010, pp. 390-391.

Leven, A., et al., "Real-Time Implementation of Digital Signal Processing for Coherent Optical Digital Communications Systems," IEEE Journal of Selected Topics in Quantum Electronics, vol. 16, No. 5, pp. 1227-1234, Sep./Oct. 2010.

Nelson, L.E., et al., "Performance of a 46-Gbps Dual-Polarization QPSK Transceiver With Real-Time Coherent Equalization Over High PMD Fiber," Journal of Lightwave Technology, vol. 27, No. 3, pp. 158-167, Feb. 1, 2009.

Roberts, K., et al., "Performance of Dual-Polarization QPSK for Optical Transport Systems," Journal of Lightwave Technology, vol. 27, No. 16, pp. 3546-3559, Aug. 15, 2009.

Viterbi, A.J., et al., "Nonlinear Estimation of PSK-Modulated Carrier Phase with Application to Burst Digital Transmission," IEEE Transactions on Information Theory, vol. IT-29, No. 4, pp. 543-551, Jul. 1983.

United States Office Action, U.S. Appl. No. 12/938,040, dated May 6, 2013, 26 pages.

United States Office Action, U.S. Appl. No. 12/938,040, dated Jun. 19, 2012, 6 pages.

United States Office Action, U.S. Appl. No. 14/629,243, dated Sep. 14, 2015, 9 pages.

United States Office Action, U.S. Appl. No. 14/311,019, filed Aug. 25, 2015, 24 pages.

United States Office Action, U.S. Appl. No. 13/608,993, dated Apr. 11, 2014, 10 pages.

* cited by examiner $y_0 = c_{00}x_0 + c_{01}x_1 + c_{02}x_2 + c_{03}x_3$
$y_1 = c_{10}x_0 + c_{11}x_1 + c_{12}x_2 + c_{13}x_3$
$y_2 = c_{20}x_0 + c_{21}x_1 + c_{22}x_2 + c_{23}x_3$
$y_3 = c_{30}x_0 + c_{31}x_1 + c_{32}x_2 + c_{33}x_3$ Let e=(e1,e2,e3,e4) be the output of the FFE
The Stokes parameters for e are:

$$s_0 = e_1^2 + e_2^2 + e_3^2 + e_4^2$$
$$s_1 = e_1^2 + e_2^2 - e_3^2 - e_4^2$$
$$s_2 = 2(e_1 e_3 + e_2 e_4)$$
$$s_3 = 2(e_1 e_4 - e_2 e_3)$$

In the following we assume $S_0 = 1$

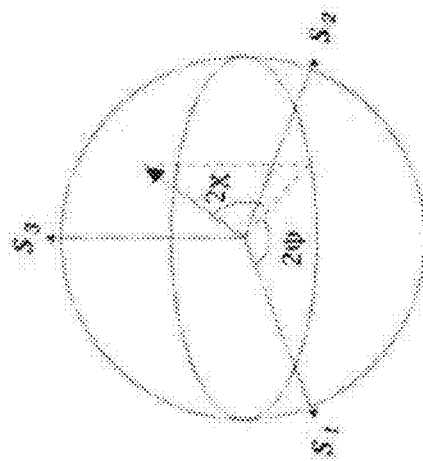

- Circularly polarized states are represented by $S_3 = 1$ or $S_3 = -1$ (north or south poles)
- Linearly polarized states are represented by vectors in the equatorial plane
- Linearly polarized states aligned with the X and Y axes lie on the $S_1$ axis
- Linearly polarized states at 45° or 135° with the X axis lie on the $S_2$ axis

Unwrapped phase error from plot on the left and least squares fit to phase error Samples of phase error (mod $\pi/2$) for a carrier frequency error of 312.5MHz

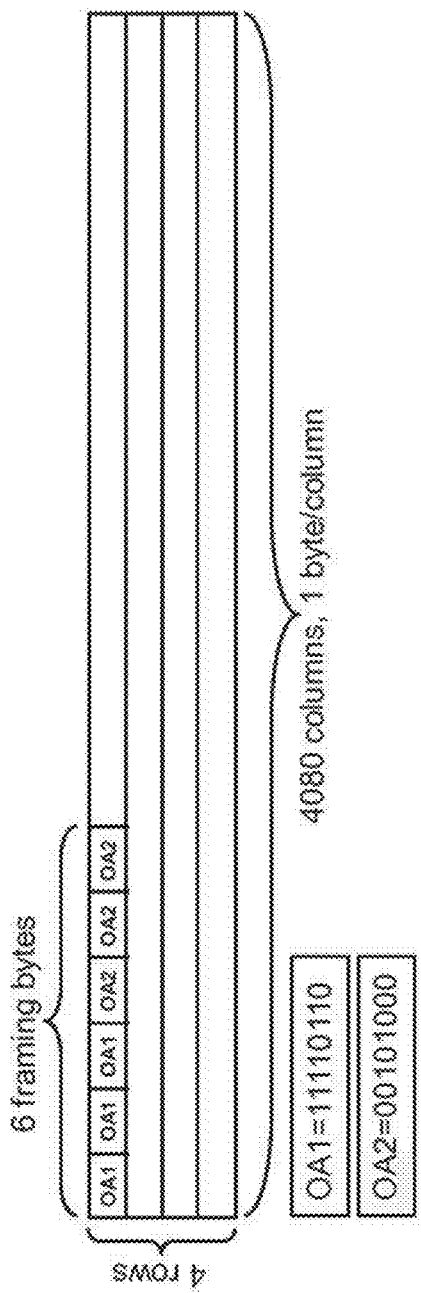
FIG. 39A
FIG. 39B
FIG. 39C

| Framing Operations |
|---|
| Swap X and Y polarizations |
| Rotate X constellation by $\pi/2$ |
| Rotate X constellation by $-\pi/2$ |
| Rotate X constellation by $\pi$ |
| Flip X constellation |
| Rotate Y constellation by $\pi/2$ |
| Rotate Y constellation by $-\pi/2$ |
| Rotate Y constellation by $\pi$ |
| Flip Y constellation |
| Shift Y polarization left by T |
| Shift Y polarization left by 2T |
| Shift Y polarization left by 3T |
| Shift Y polarization left by 4T |
| Shift Y polarization left by 5T |
| Shift Y polarization right by T |
| Shift Y polarization right by 2T |
| Shift Y polarization right by 3T |
| Shift Y polarization right by 4T |
| Shift Y polarization right by 5T |

| Framing/CCR Operations |
|---|
| Dynamically rotate X constellation by $\pi/(2T)$ |
| Dynamically rotate X constellation by $-\pi/(2T)$ |
| Dynamically rotate X constellation by $\pi/T$ |
| Dynamically rotate Y constellation by $\pi/(2T)$ |
| Dynamically rotate Y constellation by $-\pi/(2T)$ |
| Dynamically rotate Y constellation by $\pi/T$ |

FIG. 40

HIGH-SPEED OPTICAL COMMUNICATIONS SYSTEM

CROSS-REFERENCE TO RELATED APPLICATION(S)

This application is a continuation of U.S. application Ser. No. 14/311,019 entitled "High-Speed Optical Communications System" filed on Jun. 20, 2014 to Oscar E. Agazzi, et al., which is a continuation of U.S. application Ser. No. 12/938,040 entitled "High-Speed Optical Communications System" filed on Nov. 2, 2014 to Oscar E. Agazzi, et al., which claims priority under 35 U.S.C. §119(e) to U.S. Provisional Patent Application Ser. No. 61/257,384, "Optical Communication System Architecture and Implementation," filed Nov. 2, 2009 by Oscar E. Agazzi et al. The subject matter of all of the foregoing applications are incorporated herein by reference in their entirety.

BACKGROUND OF THE INVENTION

Field of the Invention

This invention relates generally to high speed data communications.

Description of the Related Art

Optical fiber is widely used as a communications medium in high speed digital networks, including local area networks (LANs), storage area networks (SANs), and wide area networks (WANs). There has been a trend in optical networking towards ever-increasing data rates.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 34A is a diagram of a Poincare sphere and Stokes parameters.

FIG. 34B tabulates Stokes parameters for decision vectors.

FIGS. 39A-C are diagrams illustrating OTU3 framing.

FIG. 40 is a diagram illustrating an external framing technique.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

An optical fiber communications link includes a transmitter coupled through optical fiber (the communications channel) to a receiver. A typical transmitter may include a serializer or parallel/serial converter (P/S) for receiving data from a data source on a plurality of parallel lines and providing serial data to modulator drivers. The drivers then drive modulators that modulate the in-phase and/or quadrature components of one or both polarizations of an optical carrier produced by a continuous wave laser source. The modulated optical waveform carrying the digital data is launched on optical fiber. In one particular approach, the incoming data is divided into four serial data streams, each of which drives a modulator. The four modulators account for the four possible combinations of the two polarizations (denoted X and Y) with the in-phase and quadrature components (denoted I and Q). Other types of modulators and transmitters/receivers can also be used.

On the receive side, a typical receiver includes an optical front end and a digital receiver backend. The optical front end typically includes a photodetector for receiving and detecting data from the optical fiber. The detected data is typically processed through a transimpedance amplifier (TIA).

Figure 1:
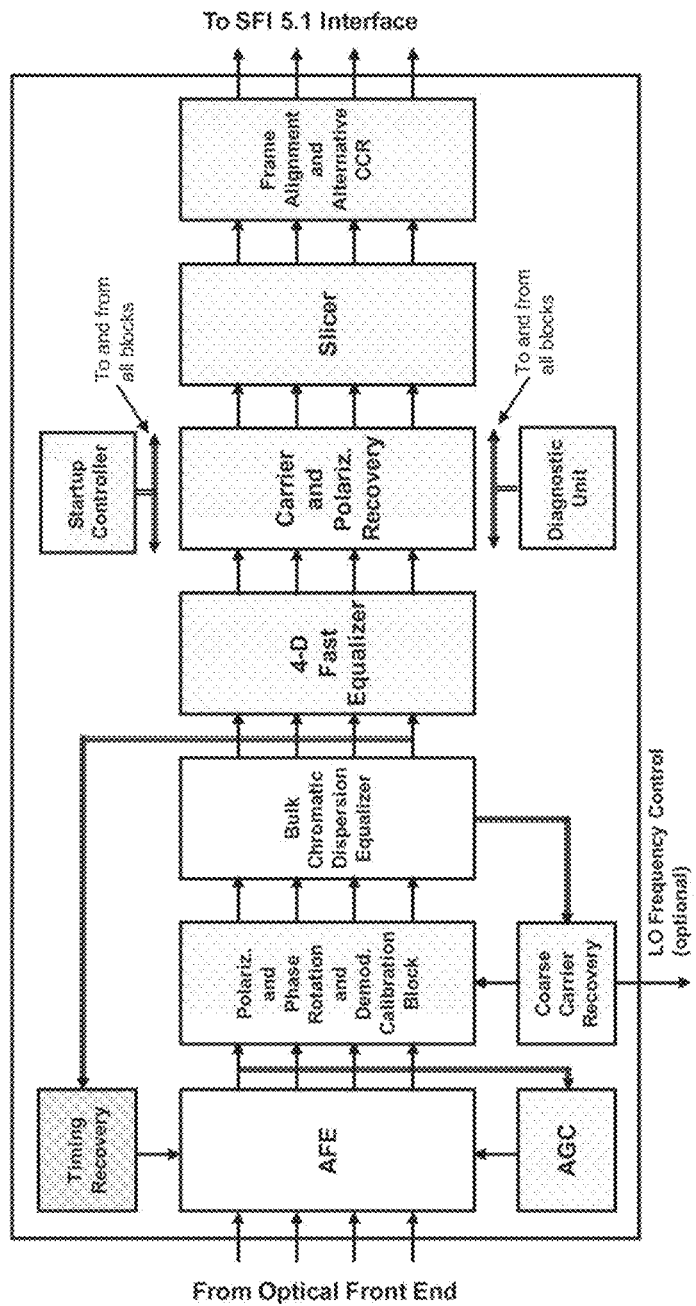
FIG. 1 is a block diagram of a digital receiver system.

FIG. 1 is a block diagram of a digital receiver system. This example receives signals from the optical front end and produces data to an SFI 5.1 interface (SERDES Framer Interface Level 5). The following example will be based on this particular interface and 40 Gb/s operation, although the invention is not limited to these specifics. The signal path from optical front end to SFI 5.1 interface has the following components: analog front end (AFE), polarization and phase rotation module and demodulation calibration block, bulk chromatic dispersion (BCD) equalizer, 4-D fast equalizer, carrier and polarization recovery module, slicer, and frame alignment and alternative CCR. Additional modules implemented in feedback loops include automatic gain control (AGC), timing recovery and coarse carrier recovery (CCR). The digital receiver system also includes a startup controller and diagnostic unit. Not all of these modules are required in every system. They are shown here for illustrative purposes. The remaining FIGS. 2-41 describe examples of the different modules, their functions and implementations in more detail.

Figure 2:
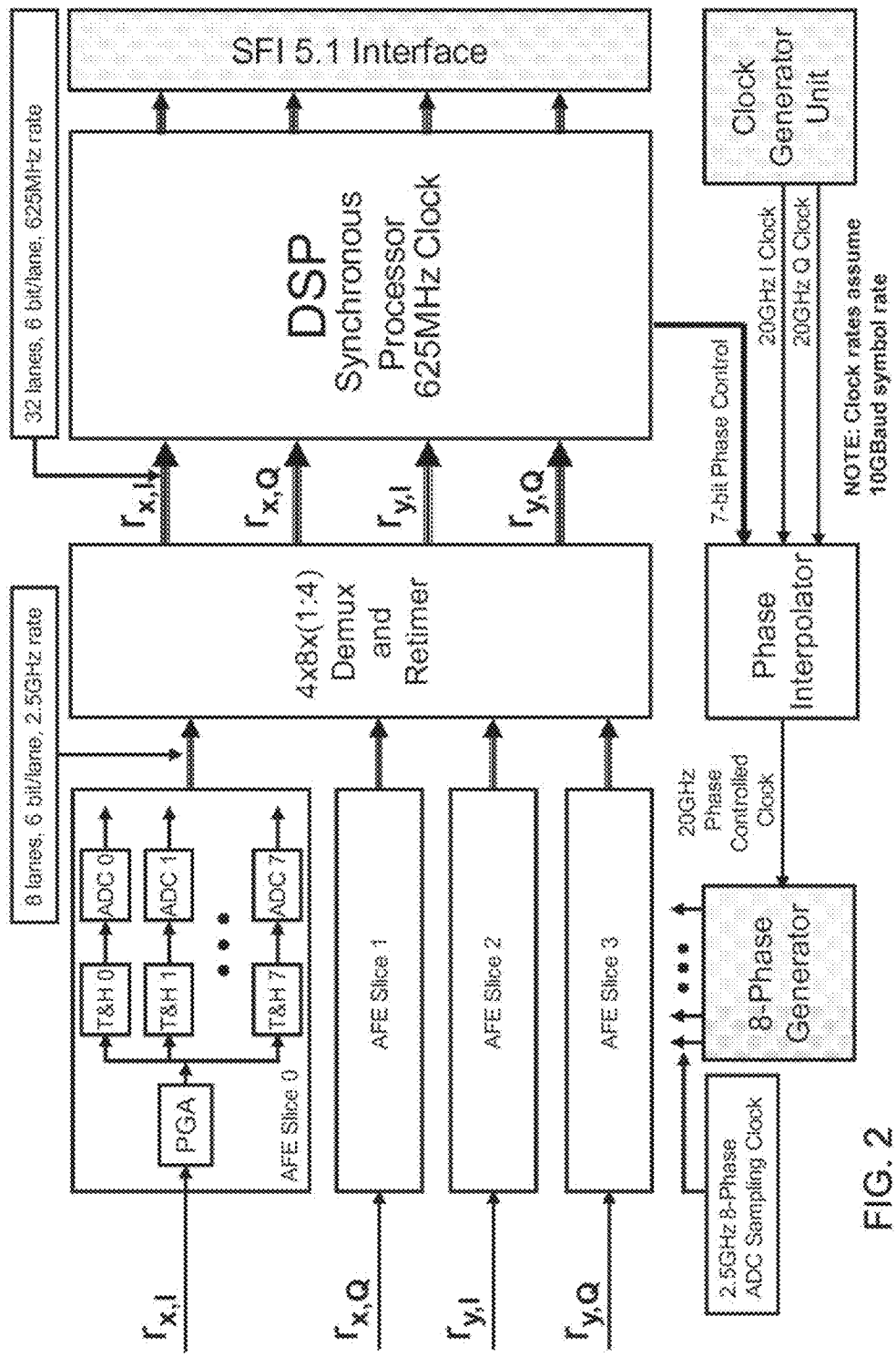
FIG. 2 is a block diagram that includes an analog front end (AFE) of a digital receiver system.

FIG. 2 is a block diagram that includes an analog front end (AFE) of a digital receiver system. In these figures, x and y represent two polarization and I and Q represent in-phase and quadrature components. Thus, the different combinations of polarization and quadrature yield four channels. The AFE includes a programmable gain amplifier (PGA) and an interleaved A/D converter (with 8 branches in this example). Each branch includes a track and hold (T&H) and A/D circuitry (ADC).

Figure 3:
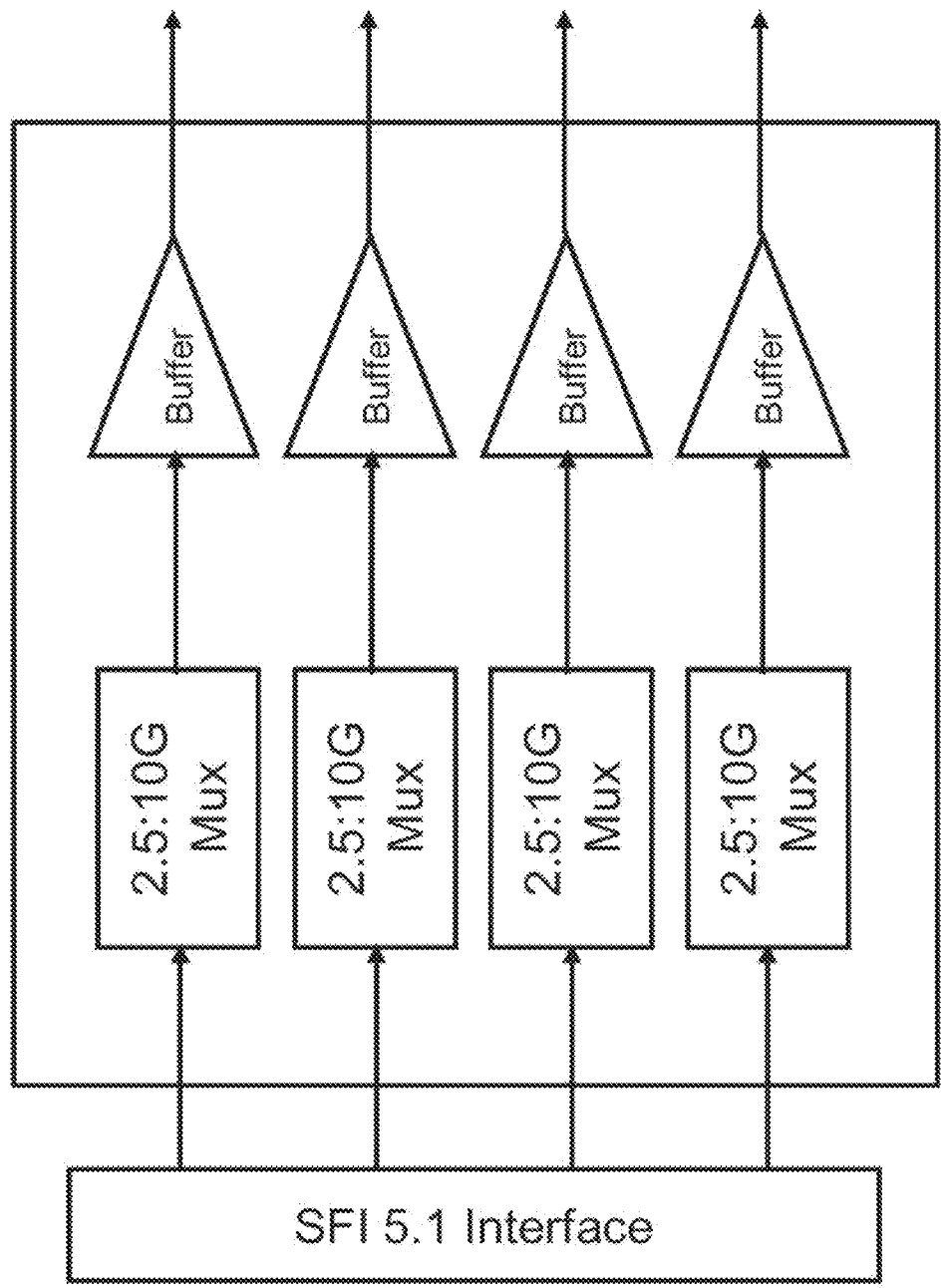
FIG. 3 is a block diagram of an analog front end for a transmitter.

FIG. 3 is a block diagram of an analog front end for a transmitter, for example if the receiver is to be combined with a transmitter to produce a transceiver.

Figure 4:
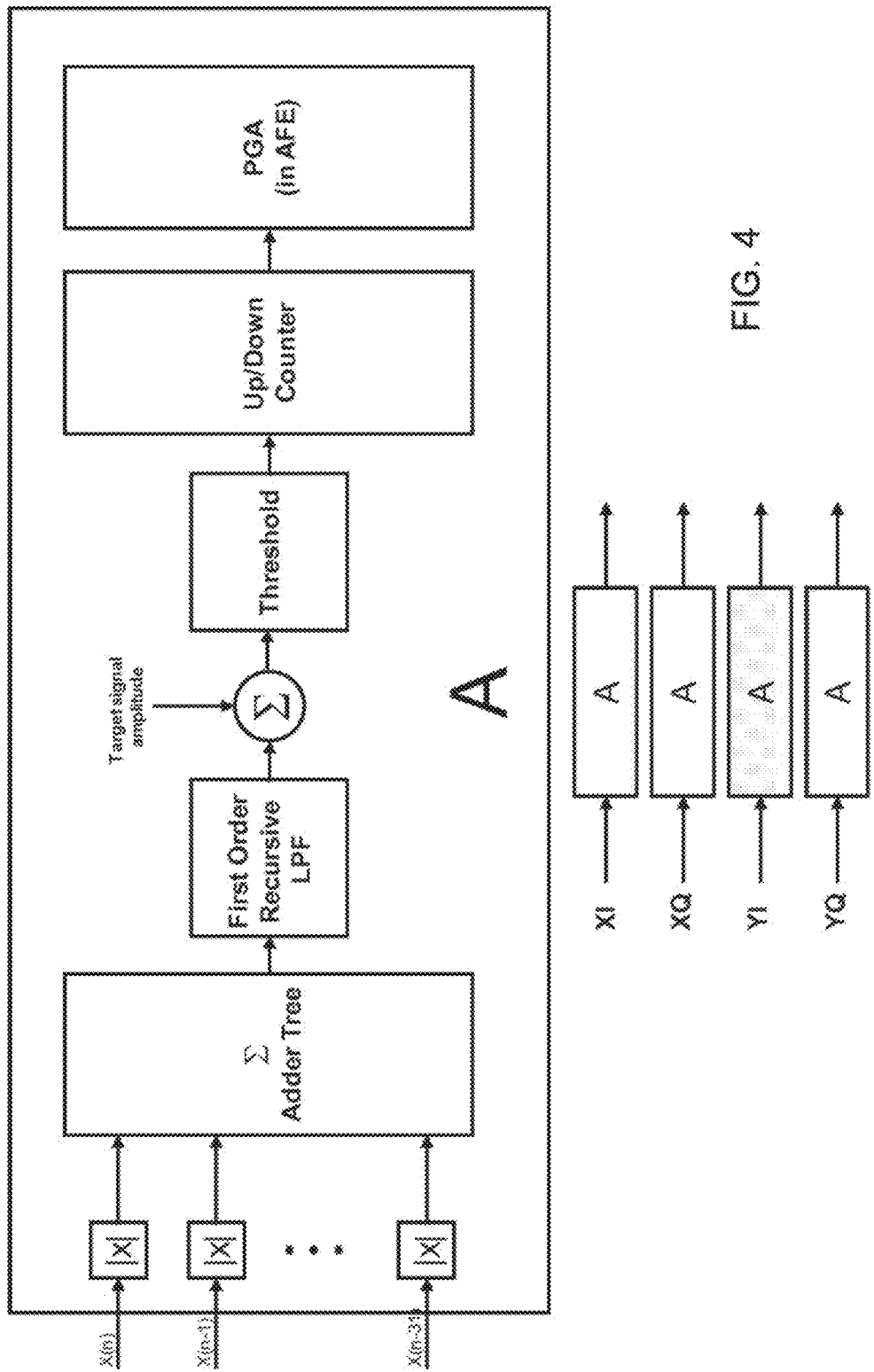
FIG. 4 is a block diagram of automatic gain control (AGC) of a digital receiver system.

FIG. 4 is a block diagram of automatic gain control (AGC) of a digital receiver system. Block A in the top part of FIG. 4 shows the feedback path for one channel. The PGA shown in block A is shown as part of the AFE in FIG. 2. The feedback path A is implemented for each of the four channels, as shown in the bottom part of FIG. 4.

Figure 5:
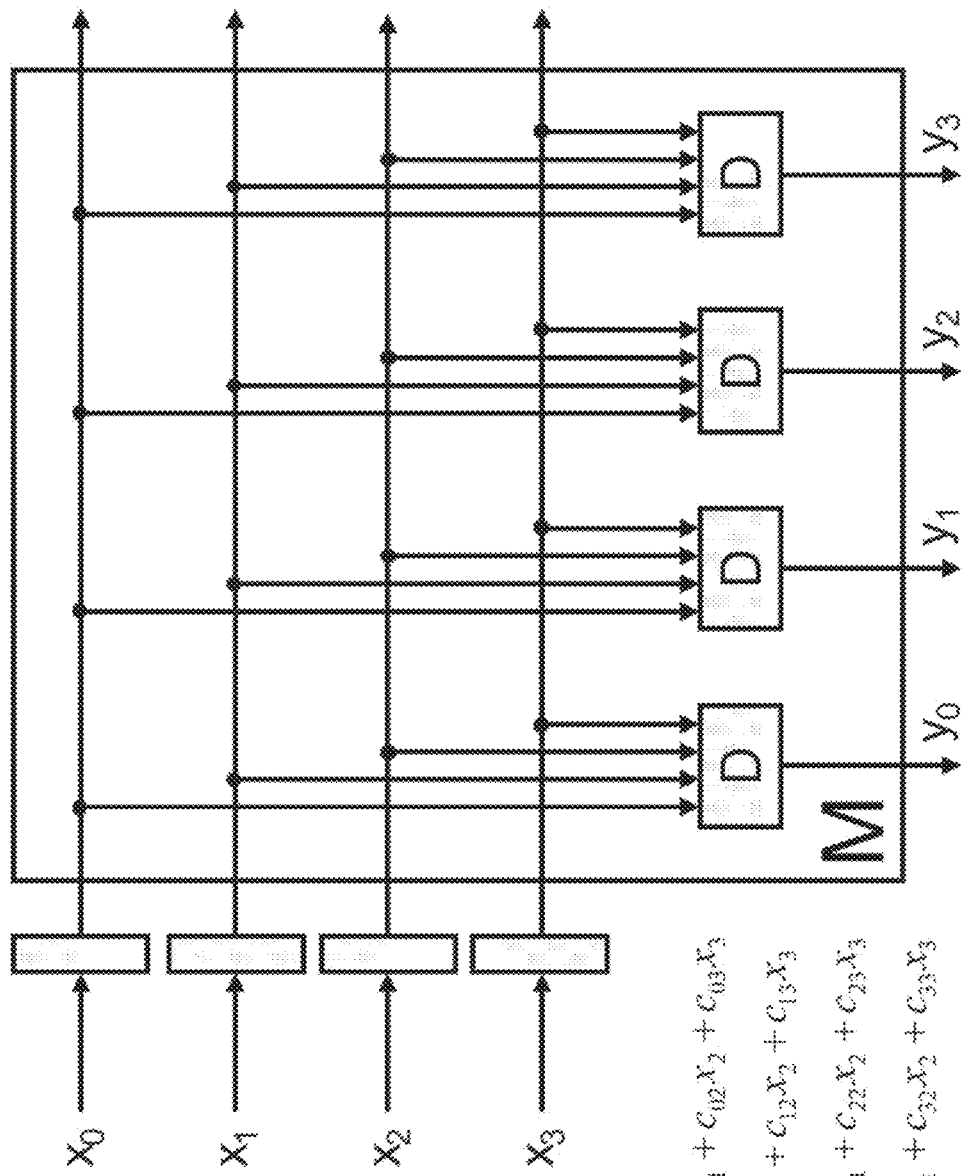
FIG. 5 is a block diagram of a demodulator calibration block of a digital receiver system.

FIG. 5 is a block diagram of a demodulator calibration block of a digital receiver system. This block M multiplies the 4-D input vector by a user-programmable 4×4 matrix. It is a building block of the FFE, reused here to calibrate the demodulator with user-provided parameters and to rotate the polarization and phase under control of the startup state machine. Besides matrix transformations, the calibration block also compensates the demodulator skews. This is done by digitally controlling the phase interpolators in the analog front-end (separate phase interpolators are used for the XI, XQ, YI, and YQ channels).

Figure 6:
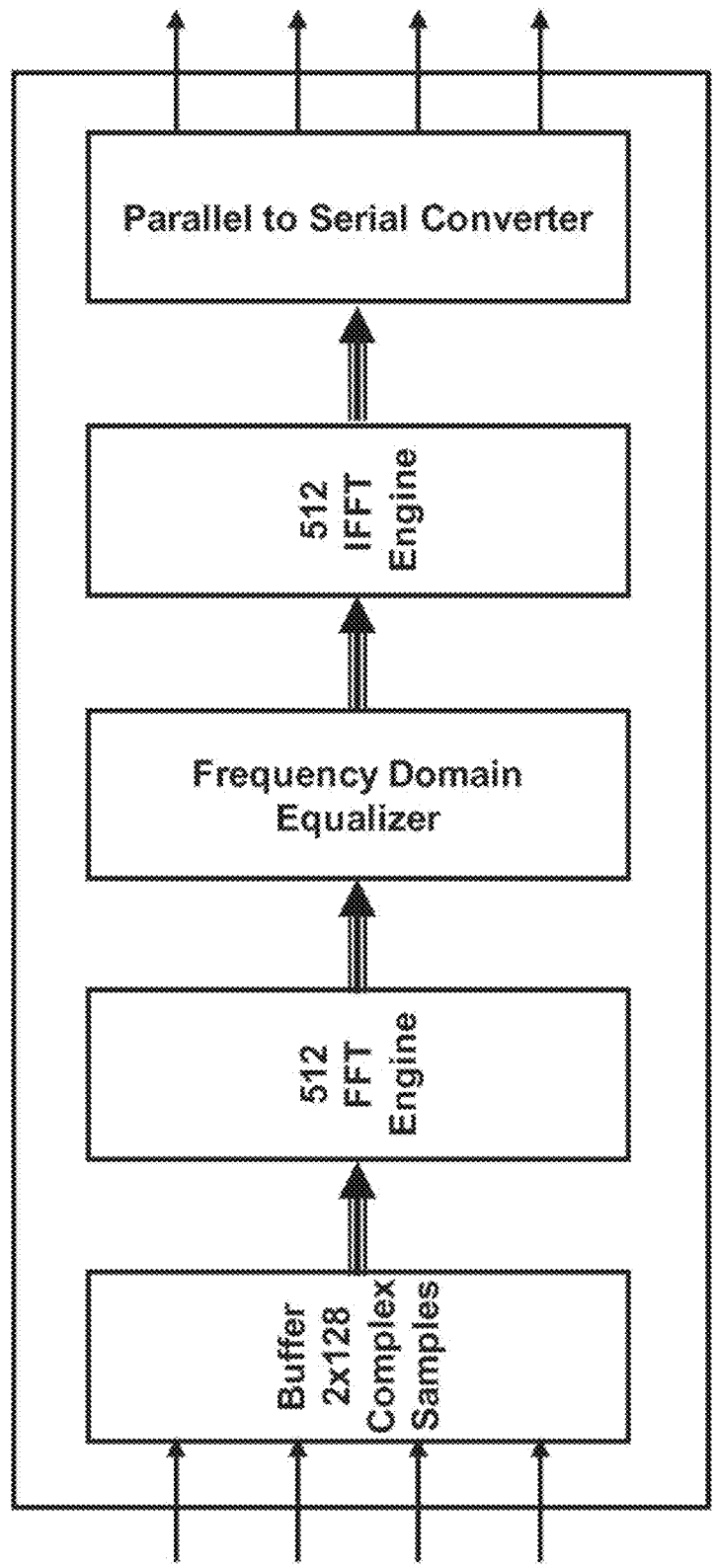
FIGS. 6-7 are block diagrams of a bulk chromatic dispersion (BCD) equalizer of a digital receiver system.
Figure 7:
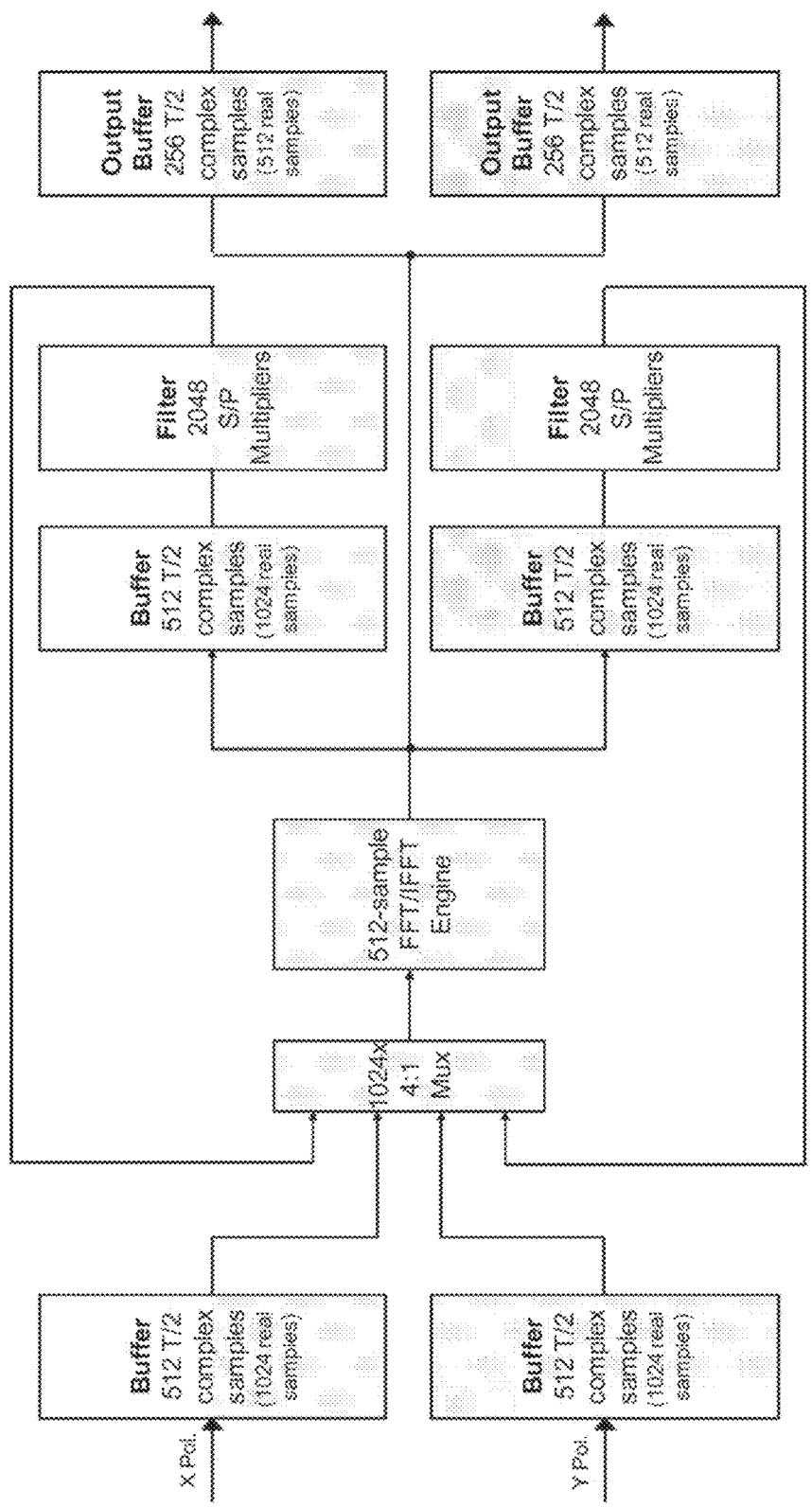
Figure 8:
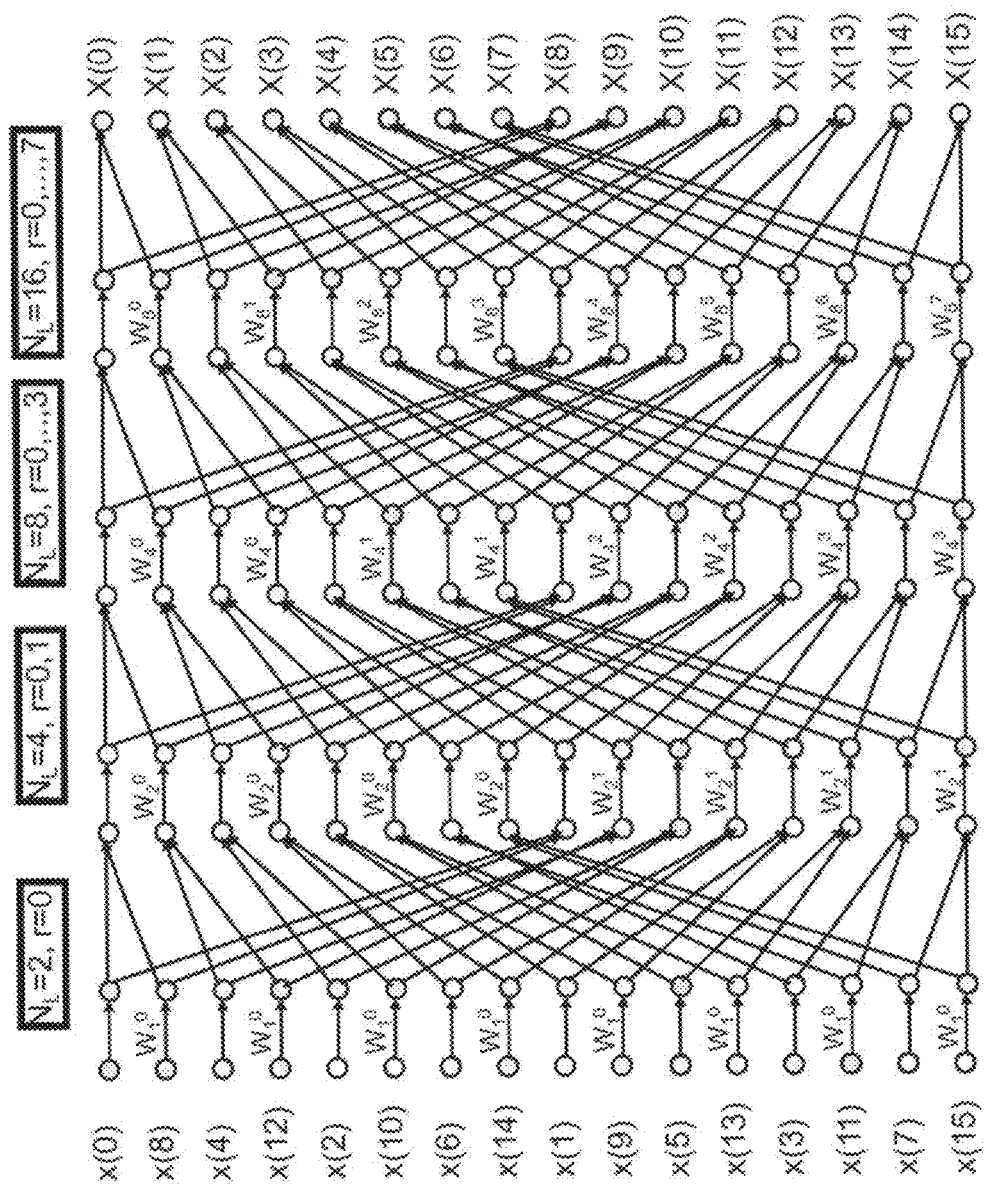
FIGS. 8-9 are block diagrams illustrating an FFT algorithm implementation and systolic processor architecture.
Figure 9:
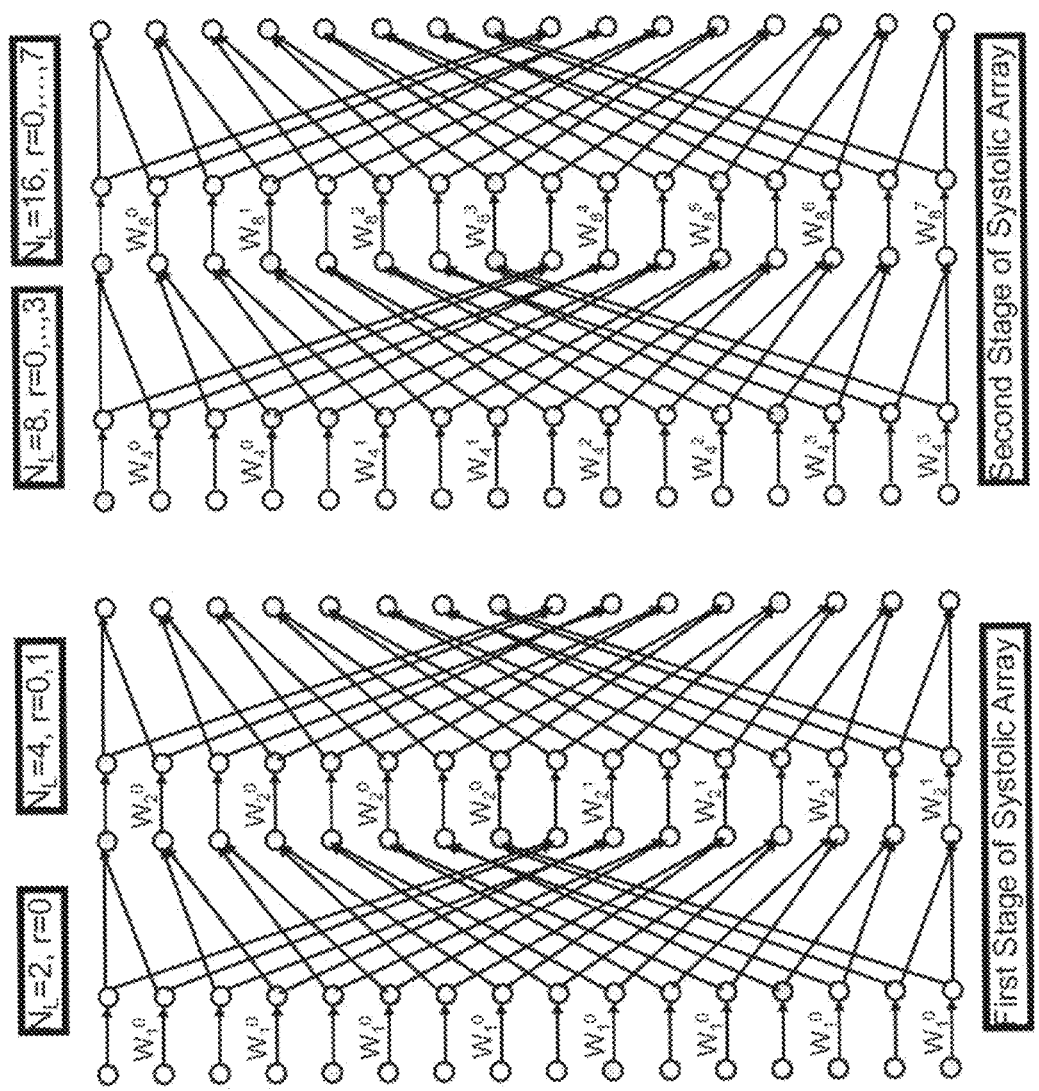
Figure 10:
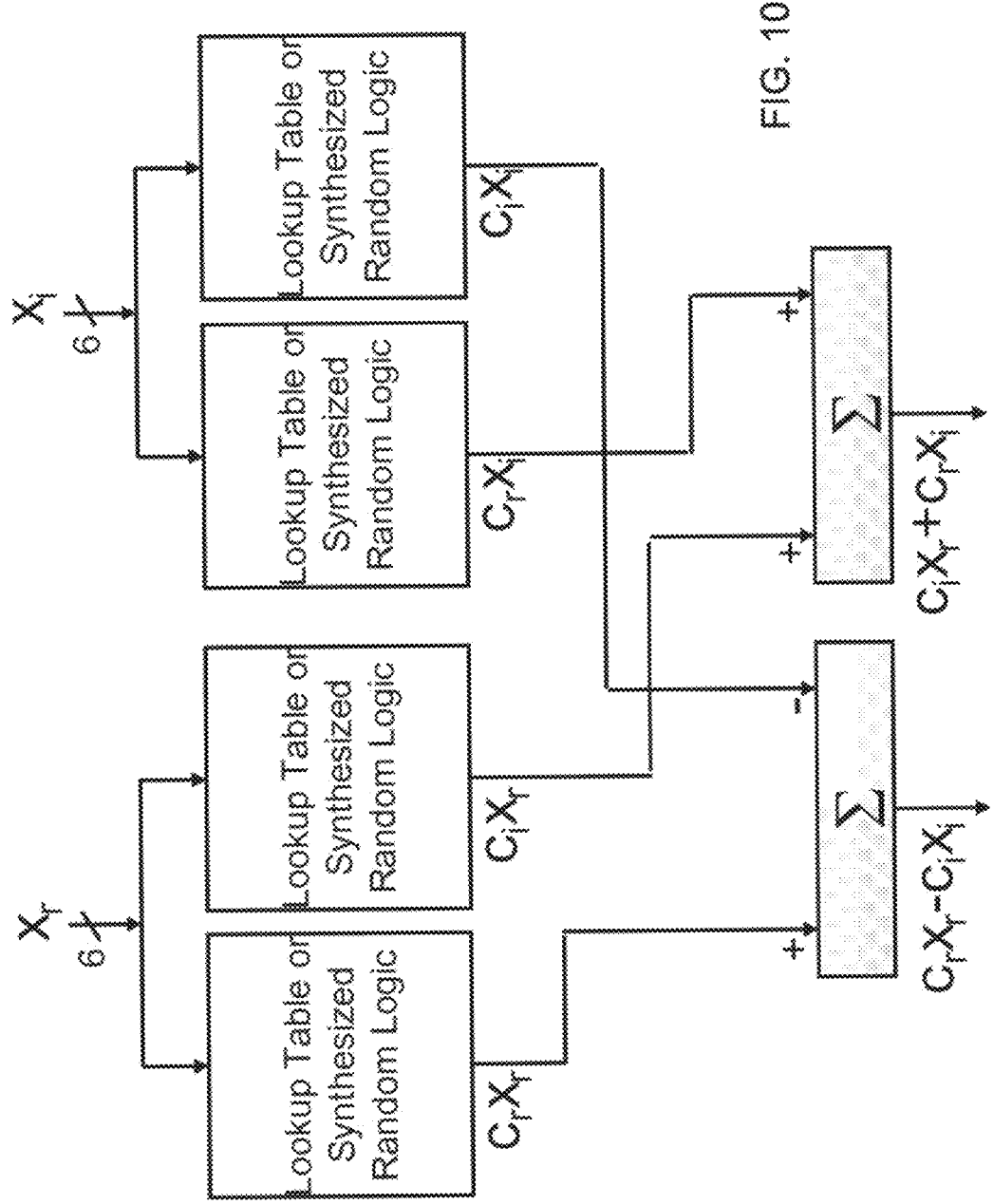
FIG. 10 is a block diagram of a lookup table (LUT) complex multiplier.

FIGS. 6-7 are block diagrams of a bulk chromatic dispersion (BCD) equalizer of a digital receiver system, and FIGS. 8-10 show components within the BCD equalizer. FIGS. 8-9 are block diagrams illustrating an FFT algorithm implementation and systolic processor architecture. FIG. 10 is a block diagram of a lookup table (LUT) complex multiplier.

This example is based on the following. The impulse response length <128T (256 T/2 samples). The input block consists of 256 T/2 samples. The FFT size is 512. An overlap and save implementation of the frequency domain filter is used. The block size is twice the input block, or 512 complex samples. Half of these samples come from a new input block, and the other half are repetition of the previous input block. The FFT engine can process 1 FFT/IFFT in two DSP clock cycles, or 4 FFT/IFFT in 8 DSP clock cycles. Multiplications in the filter are done with serial/parallel multipliers. Each S/P multiplier can process one multiplication in 8 clock cycles. The total number of multiplications in the filter is 2×512 complex, or 4096 real (every 8 DSP clock cycles). In an alternate embodiment, parallel multipliers could be used. In this example, the number of multipliers would be 512.

As shown in FIG. 8, the FFT/IFFT is implemented using a standard algorithm. This algorithm requires $(N/2)\log_2 N$ complex multiplications for an N-point FFT. One possible implementation is a direct mapping of this flow chart into hardware, as shown in FIG. 9. With this architecture, the result is a systolic processor with a throughput of 1 N-point FFT per clock cycle (of the FFT processor, which is not necessarily the same as the clock of the rest of the DSP).

In this specific example, the FFT has a size of N=512, which in an overlap and save FIR architecture corresponds to a block size of 256 samples (since 2 consecutive blocks are concatenated). For T/2 sampling, this corresponds to 128 bauds, and for a 16-parallel DSP, this corresponds to 8 DSP clock cycles. Therefore, with the systolic architecture of FIG. 8 and assuming the processor processes 4 FFTs per block, its clock would run at half the DSP clock frequency, which is inefficient. To achieve a better utilization of the hardware it is convenient to reconfigure the systolic processor so that each stage processes two consecutive steps of the FFT, running at the full DSP clock frequency, as shown in FIG. 9. This results in a reduction of the hardware of approximately a factor of two. However, now the factors in the multiplications are not always the same, so the actual saving is less than a factor of two.

Figure 11:
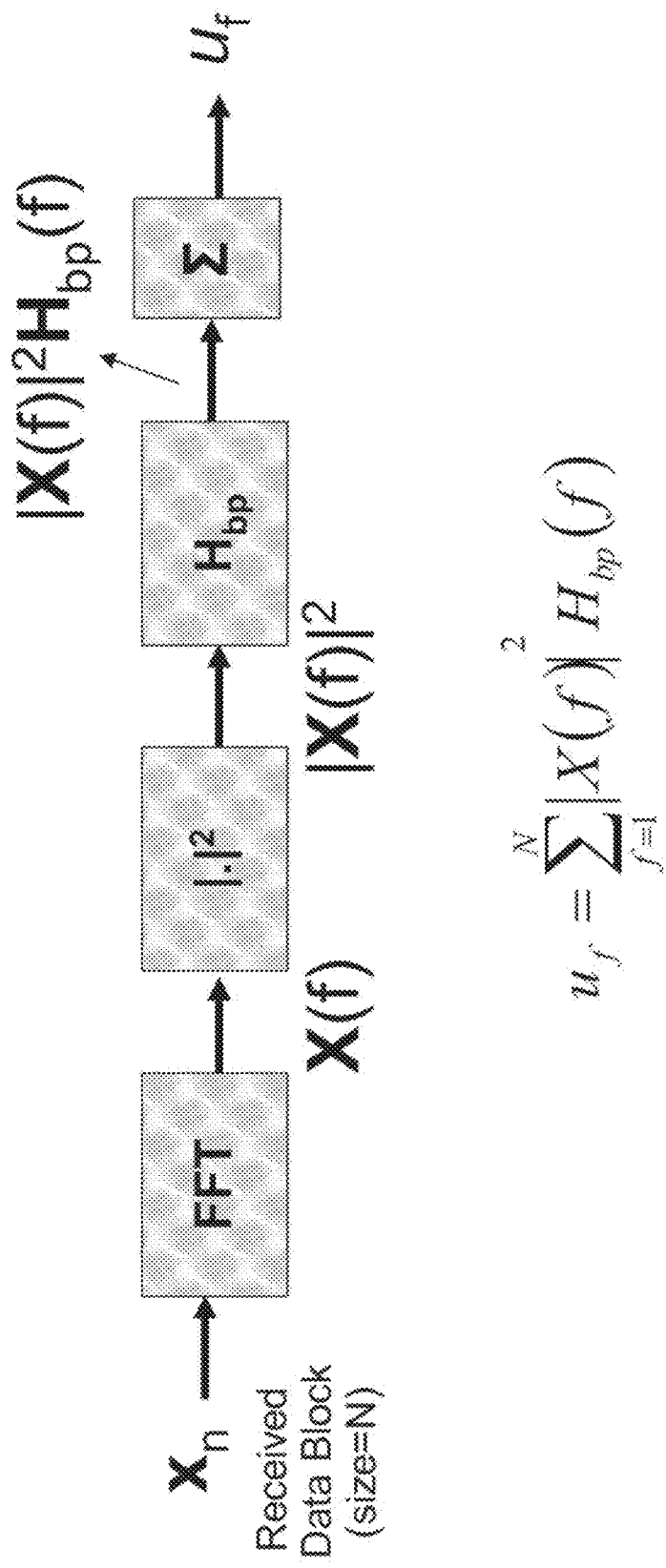
FIG. 11 is a functional block diagram of a frequency error function (FEF).
Figure 12:
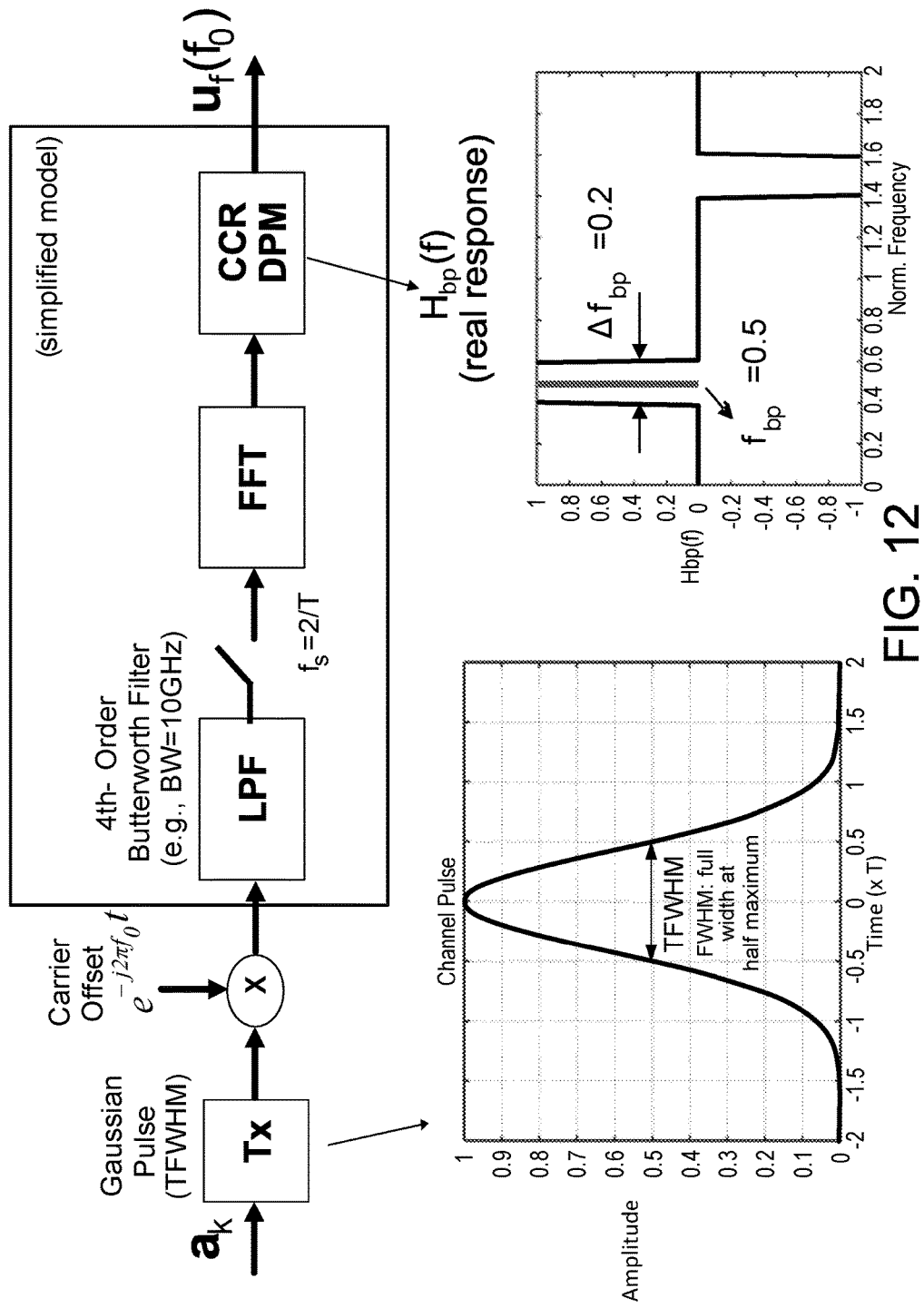
FIG. 12 is a diagram illustrating analysis of the FEF.
Figure 13:
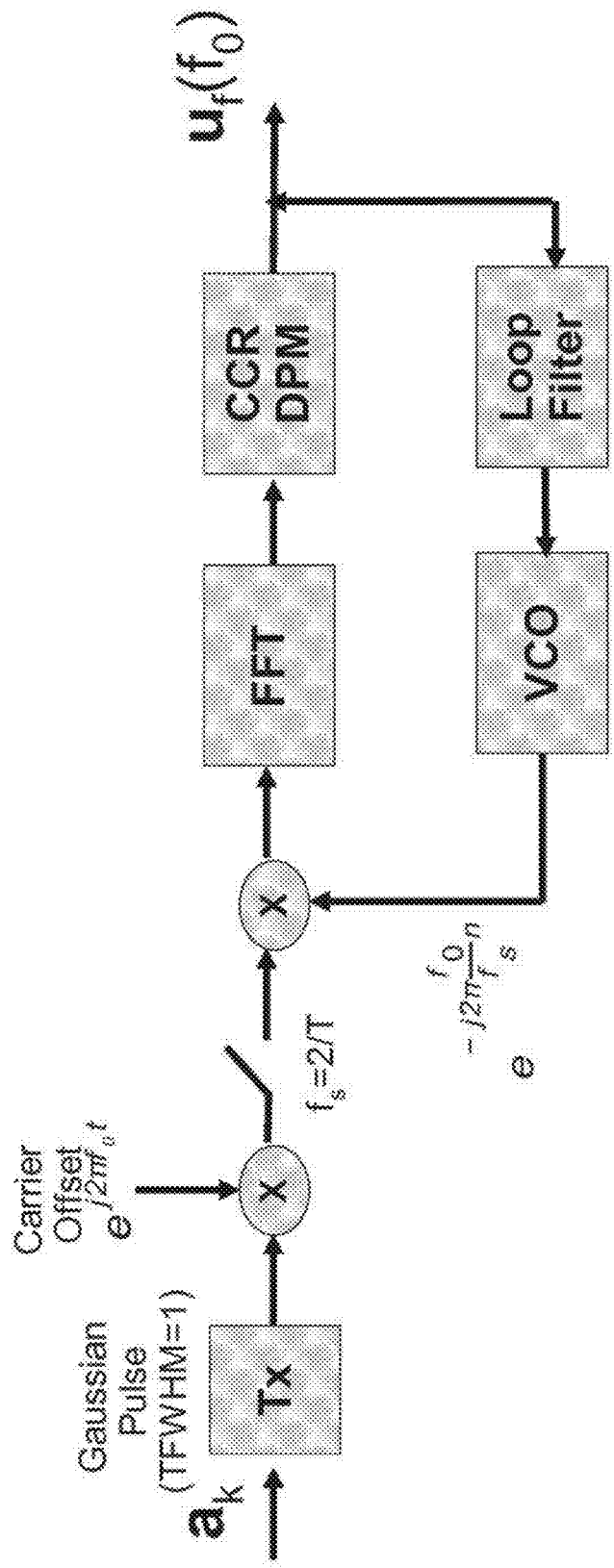
FIG. 13 is a block diagram of the CCR loop.

FIGS. 11-17 relate to the coarse carrier recovery. FIGS. 11-13 illustrate operation of the CCR loop, and FIGS. 14-17 show one possible implementation.

FIG. 11 is a functional block diagram of a frequency error function (FEF) $u_f$. FIG. 12 is a diagram illustrating analysis of the FEF. FIG. 13 is a block diagram of the CCR loop.

Figure 14:
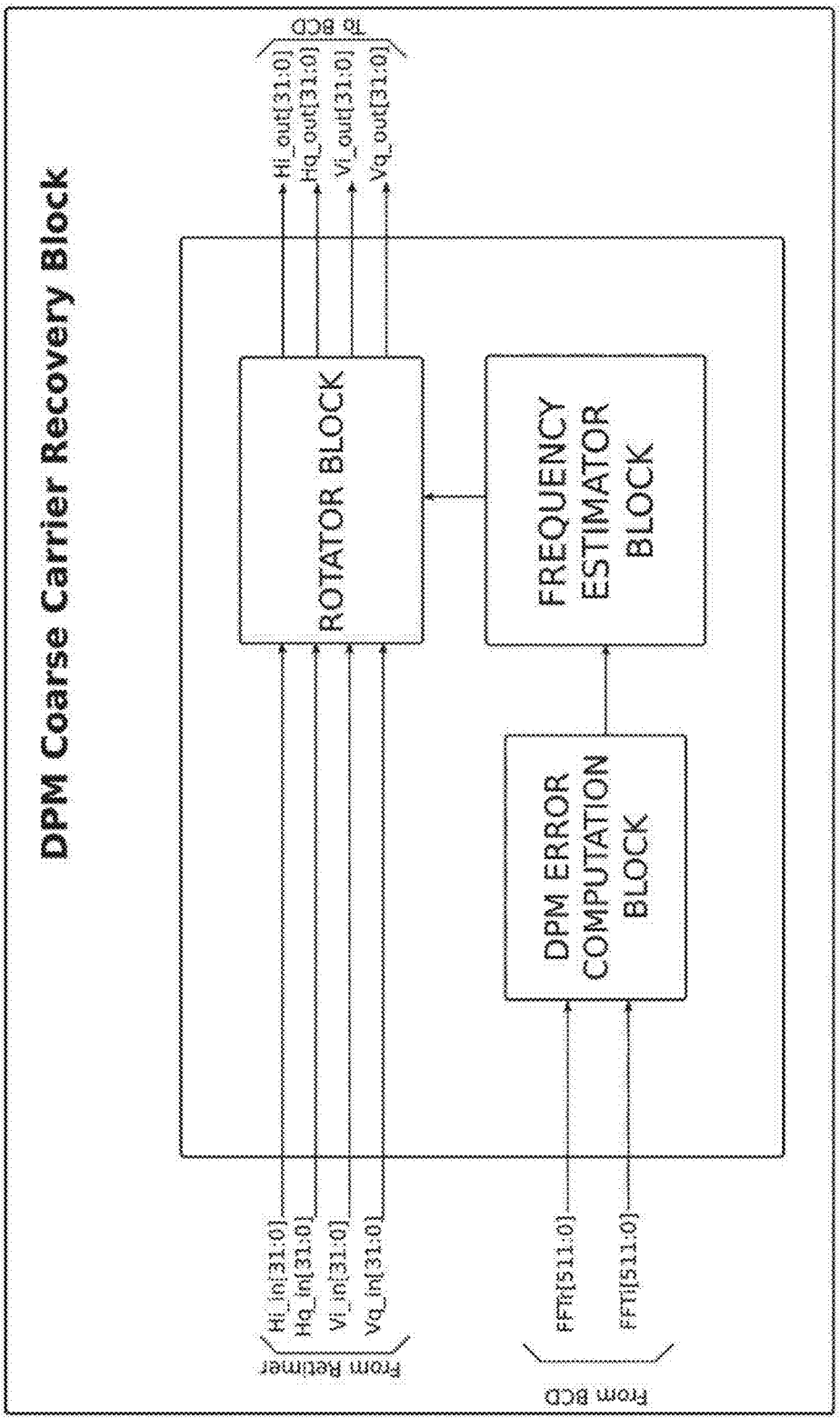
FIG. 14 is a block diagram of the DPM CCR block.
Figure 15:
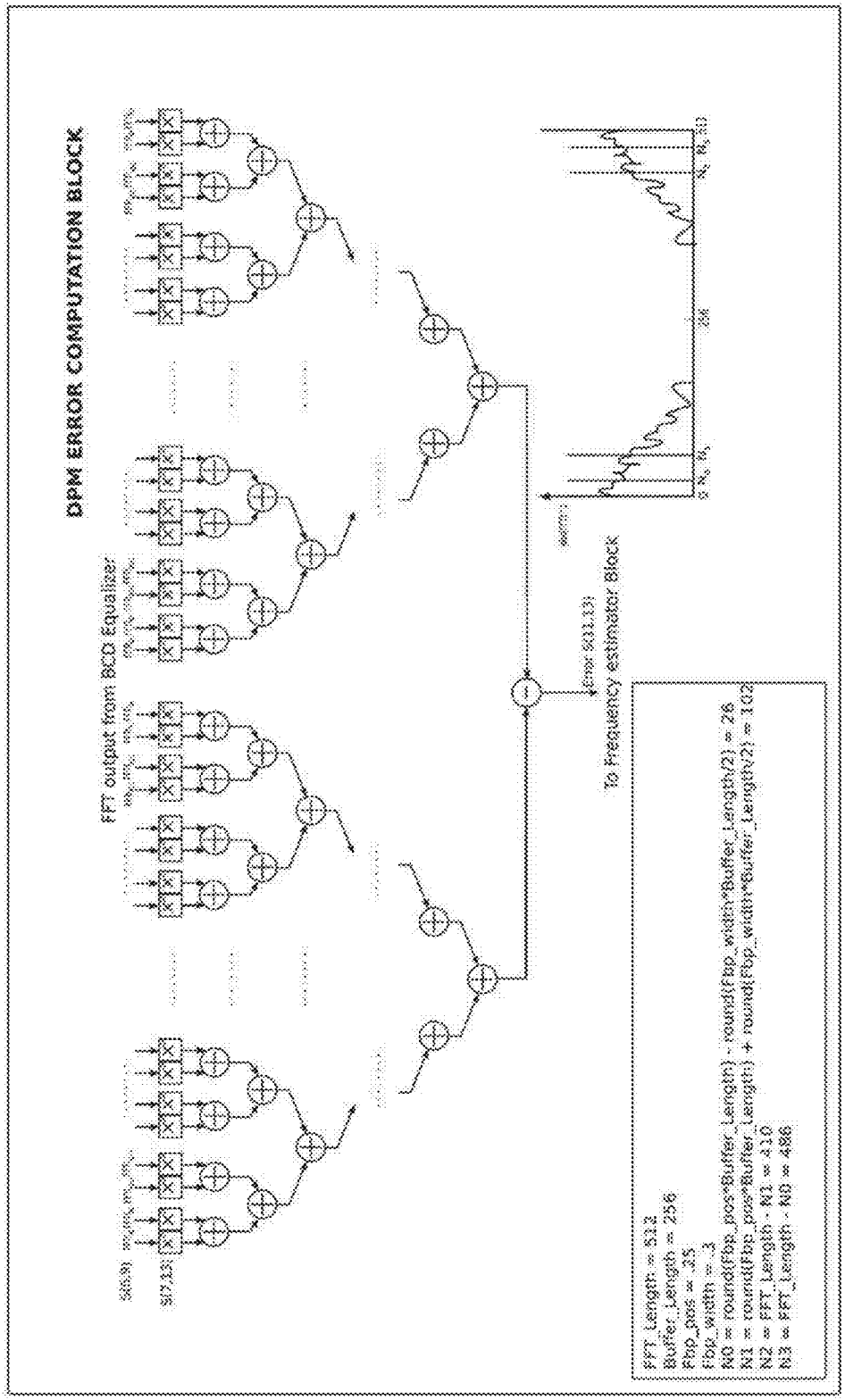
FIG. 15 is a block diagram of a DPM error computation block.
Figure 16:
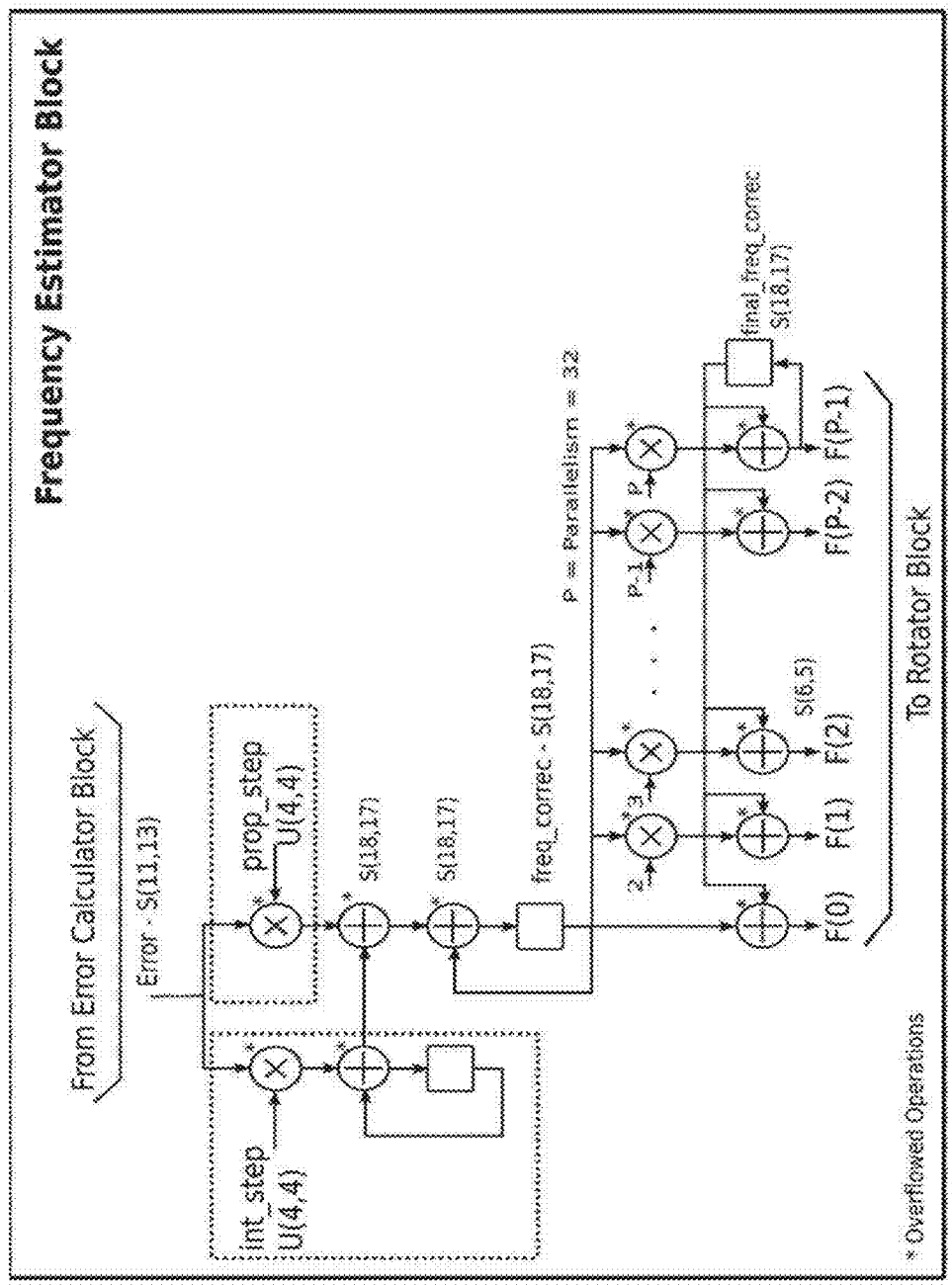
FIG. 16 is a block diagram of a frequency estimator block.
Figure 17:
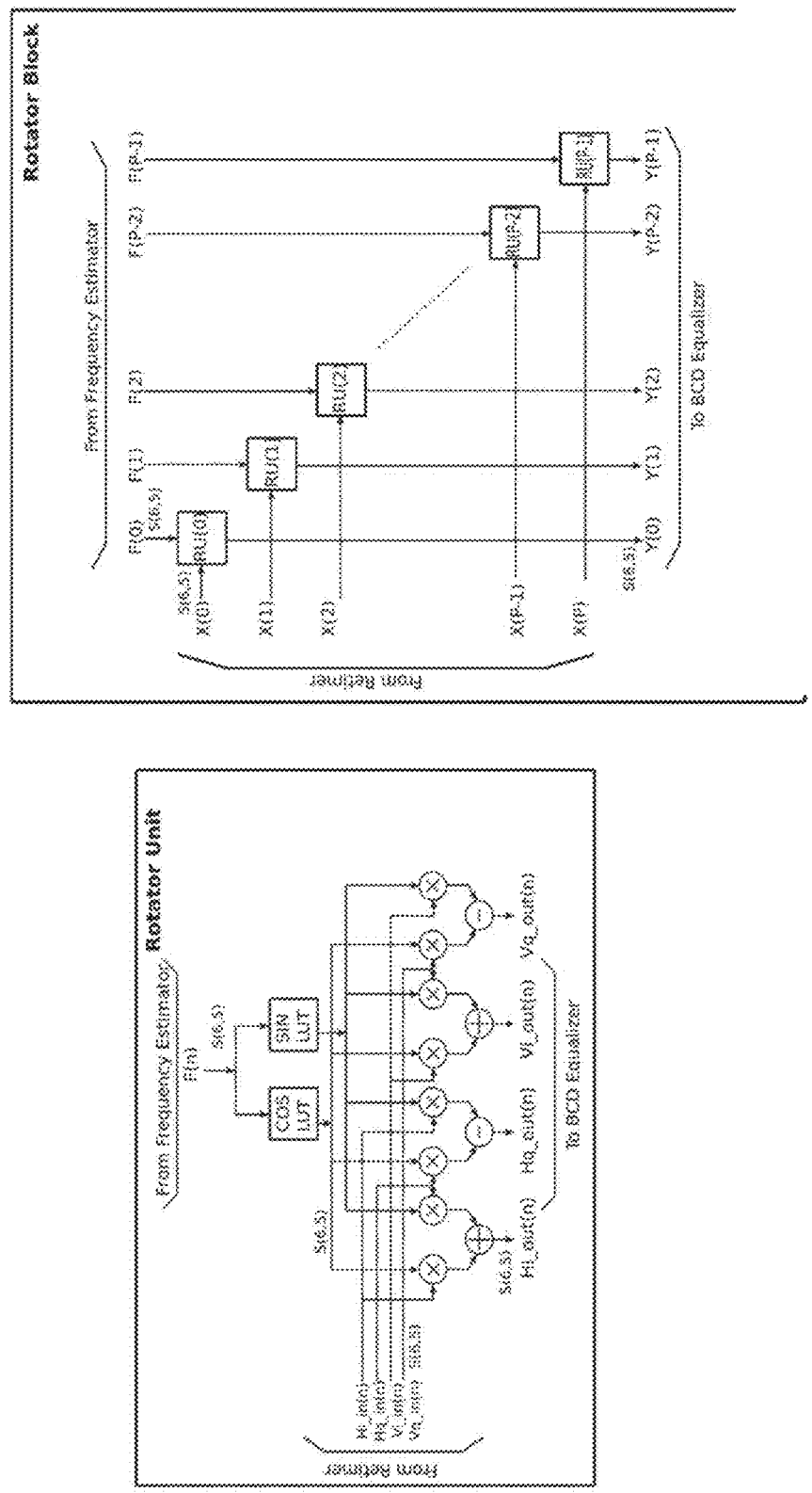
FIG. 17 is a block diagram of a rotator block.

FIG. 14 is a block diagram of the DPM CCR block. FIGS. 15-17 are block diagrams of components within the CCR block. FIG. 15 is a block diagram of a DPM error computation block. This block calculates the power density difference (error) between both sides of the BCD FFT output. FIG. 16 is a block diagram of a frequency estimator block. This block uses the calculated error to estimate the frequency offset. There is a different frequency correction factor F(n) for each input symbol. The final frequency correction for the block is taken from the last frequency correction factor F(P−1). This term is added to the next block. FIG. 17 is a block diagram of a rotator block, which rotates the retimer output (input to the receiver) using the frequency estimate. There may also be a CCR status flag block, to assert an OK flag when the filtered error is below a certain threshold.

In this example, the feedforward equalizer (FFE) is a traditional 16-tap T/2 equalizer with a MIMO structure. The input is a 4-dimensional (real) vector and coefficients are 4×4 (real) matrices. "Complex butterfly" constraints are not imposed. Complex butterfly constraints are equivalent to making the equalizer 2-dimensional complex instead of 4-dimensional real. Alternatively, they can be viewed as forcing the 4×4 real coefficient matrices to be composed of 4 2×2 unitary matrices. By removing the unitary constraints in the 2×2 submatrices, the equalizer is allowed to compensate angle errors in the modulator or other errors that cause the QPSK constellation not to be perfectly square.

Figure 18:
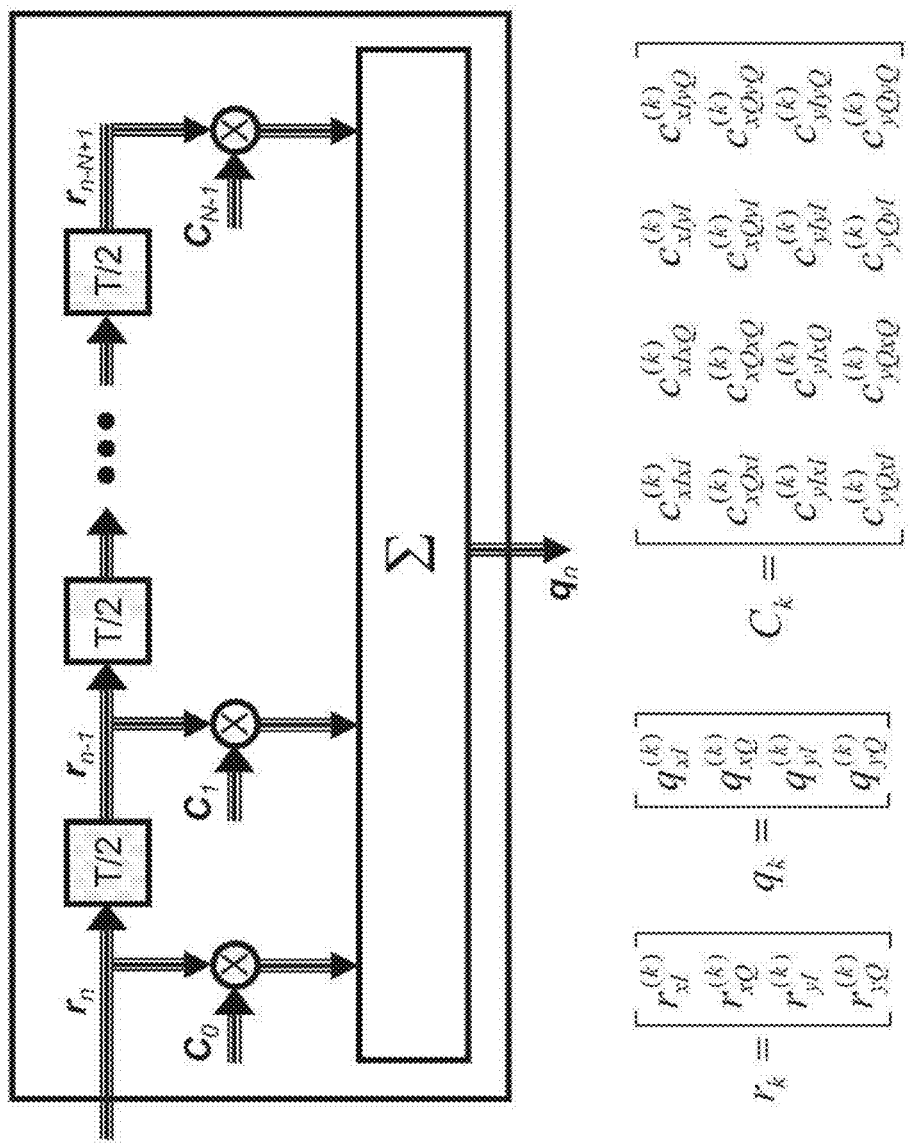
FIG. 18 is a block diagram of a joint phase and polarization equalization.
Figure 19:
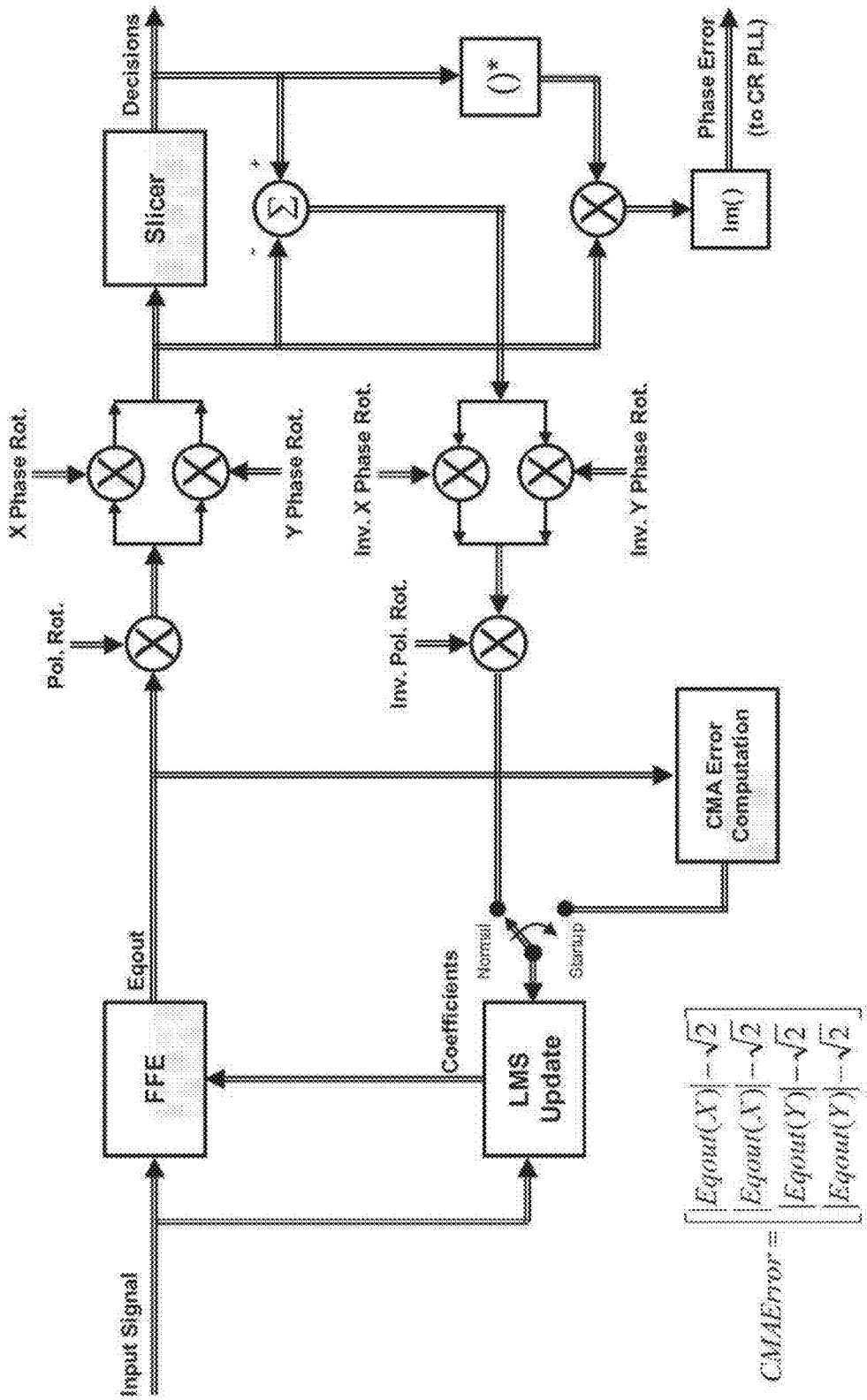
FIG. 19 is a block diagram of error computation and equalizer adaptation.

FIG. 18 is a block diagram of a joint phase and polarization equalization. FIG. 19 is a block diagram of error computation and equalizer adaptation.

Figure 20:
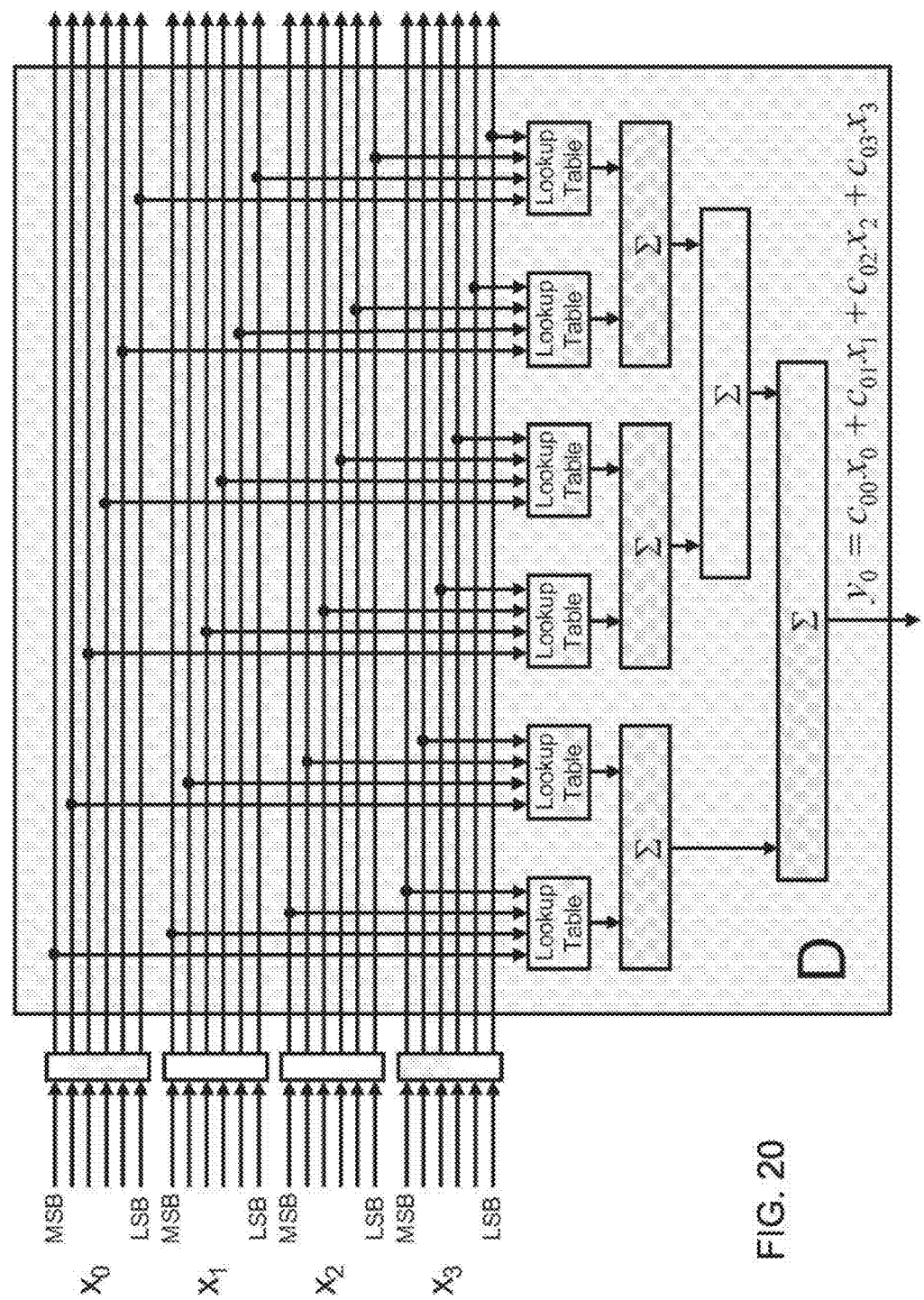
FIGS. 20-23 are block diagrams of a 16-tap, 16-way-parallel T/2 MIMO feedforward equalizer.
Figure 21:
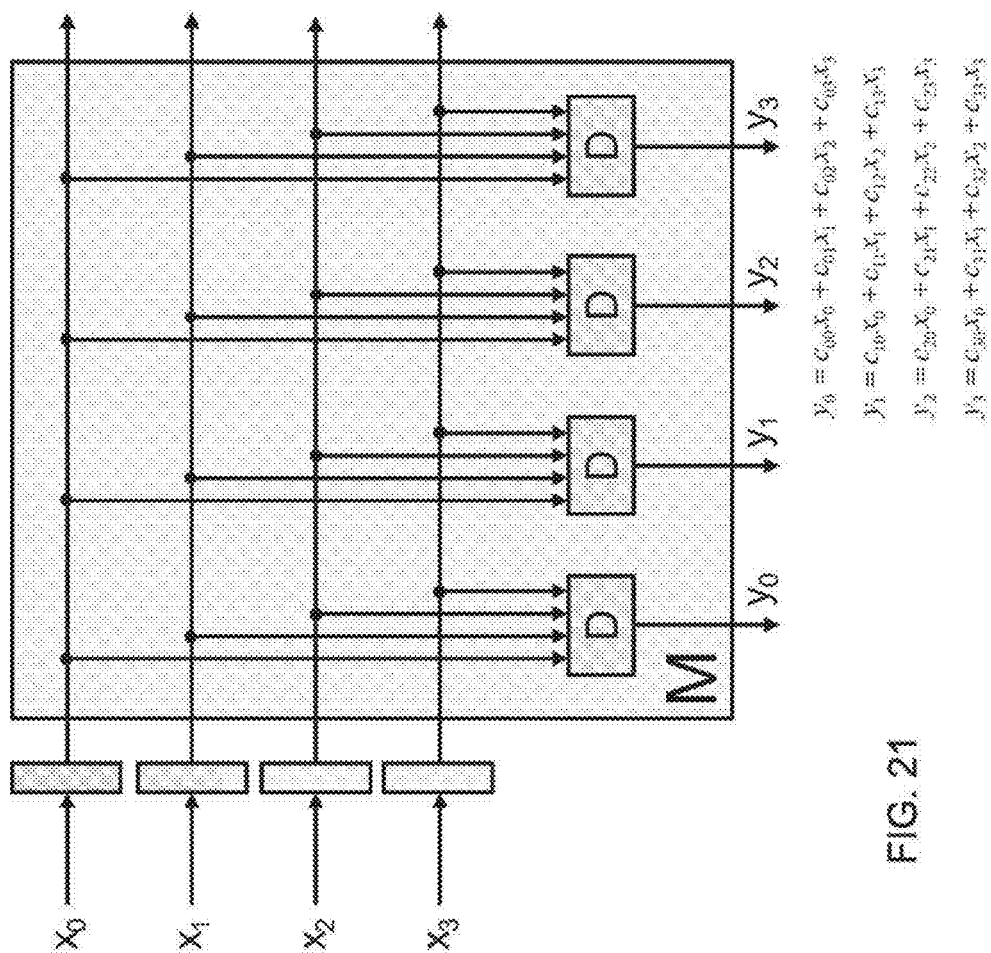
Figure 22:
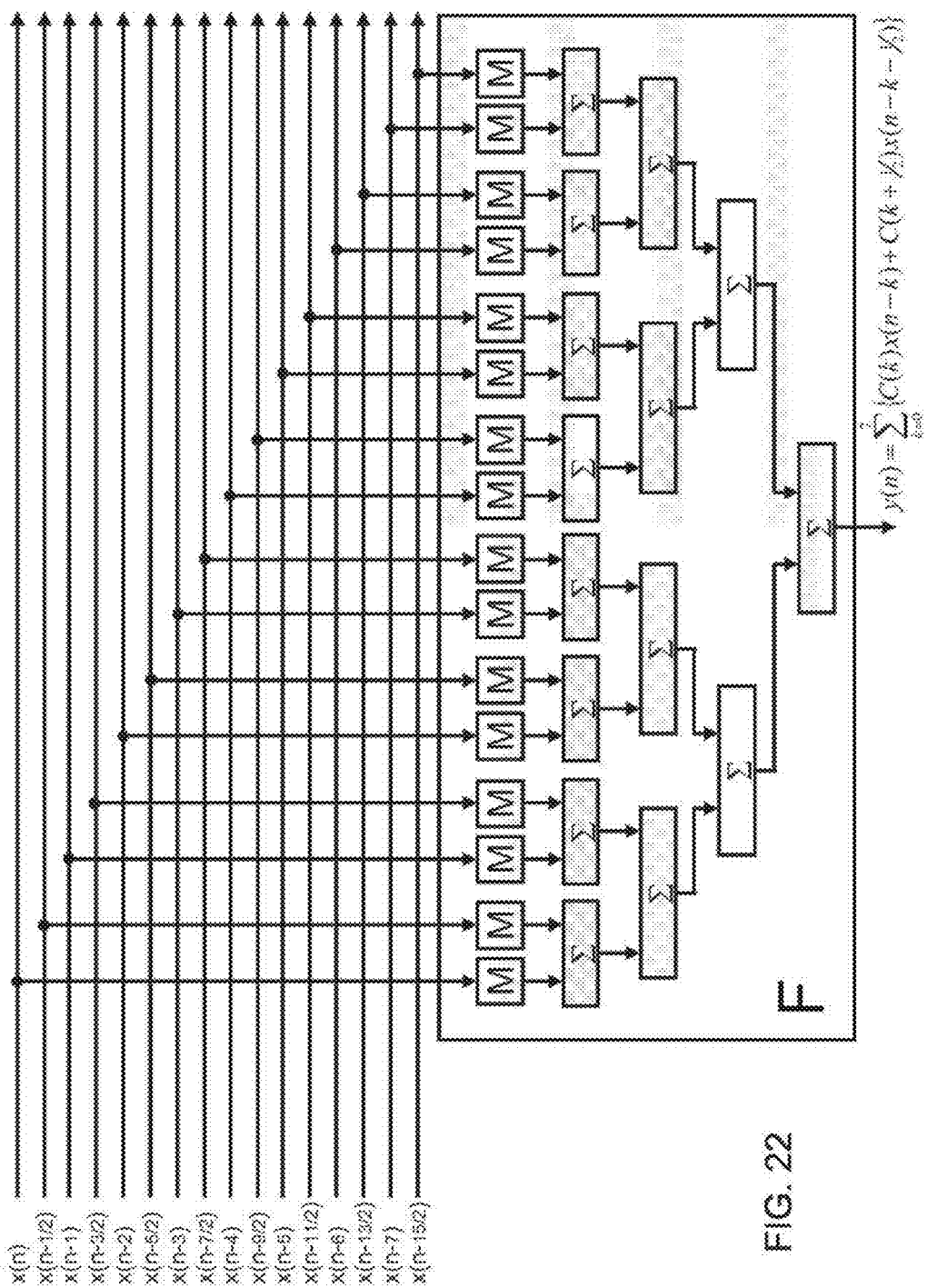
Figure 23:
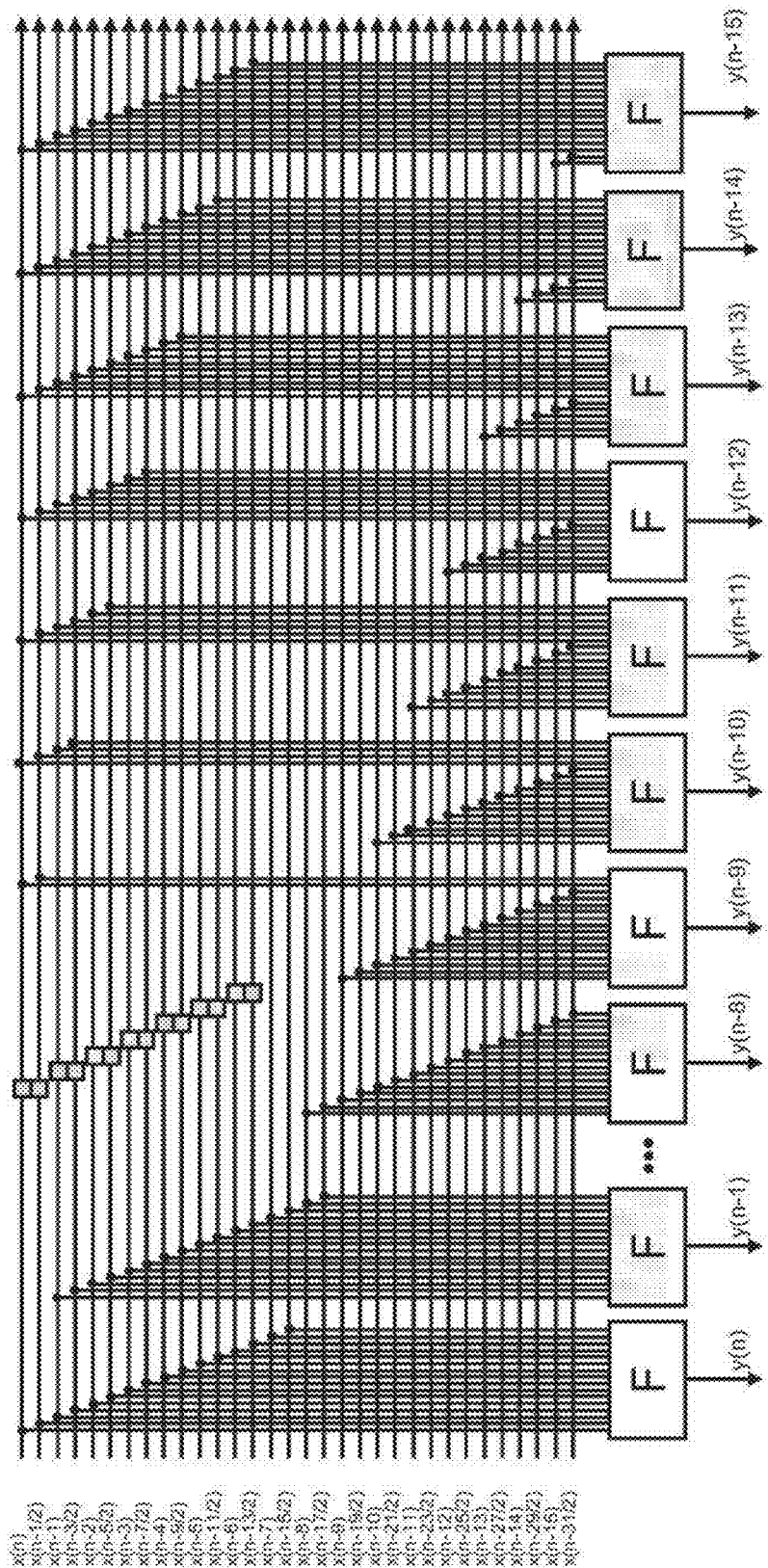

FIGS. 20-23 illustrate one implementation of a 16-tap, 16-way-parallel T/2 MIMO feedforward equalizer. It is easiest to start with FIG. 23, which shows the overall architecture. C(k) are 4×4 matrices, and x(n) and y(n) are 4-D vectors. FIG. 22 illustrates 16-tap processing element block F from FIG. 23. FIG. 21 illustrates a distributed arithmetic matrix-vector multiplication engine (block M in FIG. 22). FIG. 20 illustrates a distributed arithmetic dot product engine (block D in FIG. 21).

The total number of 16-entry lookup tables for a 16-tap, 16-way parallel MIMO equalizer is 6 tables per dot product×4 dot products per matrix multiplication×16 matrix multiplications per interleave×16 interleaves=6144 tables. However, out of these 6144 tables, there are only 64 groups of 96 tables each, where the 96 tables within the group have identical contents. The 64 distinct groups correspond to the 4 rows of each matrix tap, times the 16 taps of the FFE. Each group of 96 tables with identical contents consists of 6 tables per dot product×16 interleaves. It may be possible to share hardware among identical tables. However this requires multiple access logic, which may be more complicated than creating multiple instances of each table.

Figure 24:
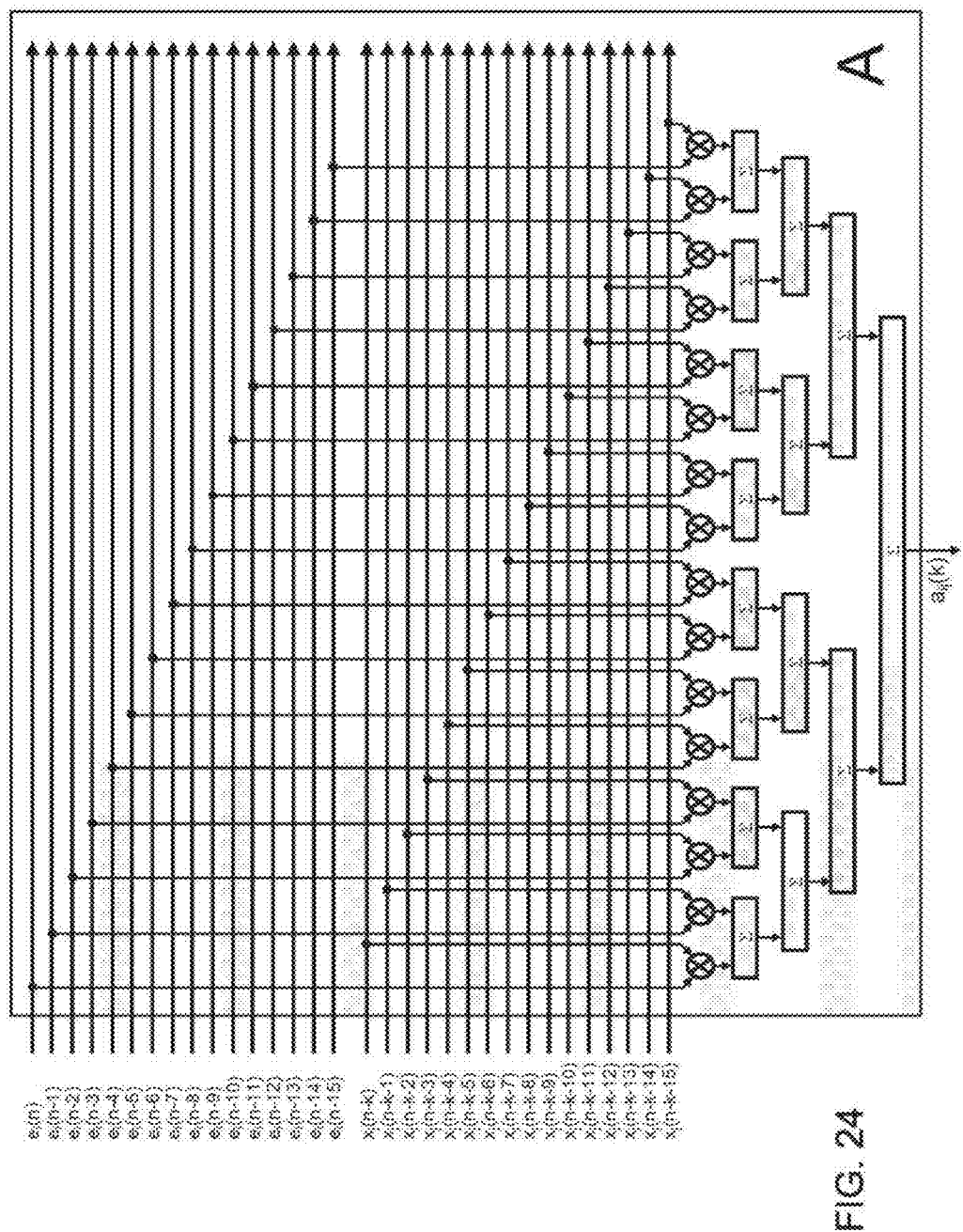
FIGS. 24-26 are block diagrams of a $C_{ij}(k)$ (k=0, ..., 15) update engine.
Figure 25:
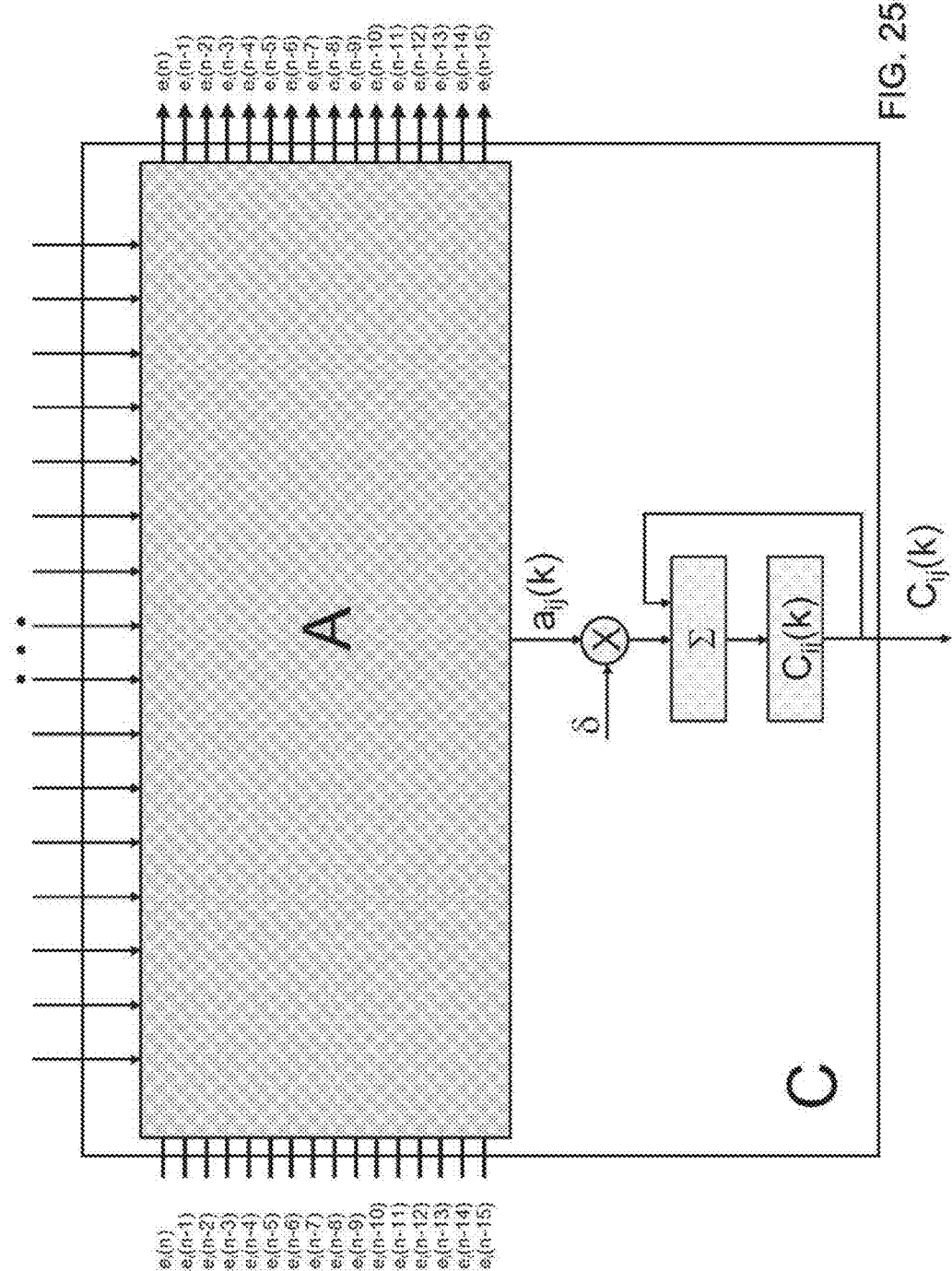
Figure 26:
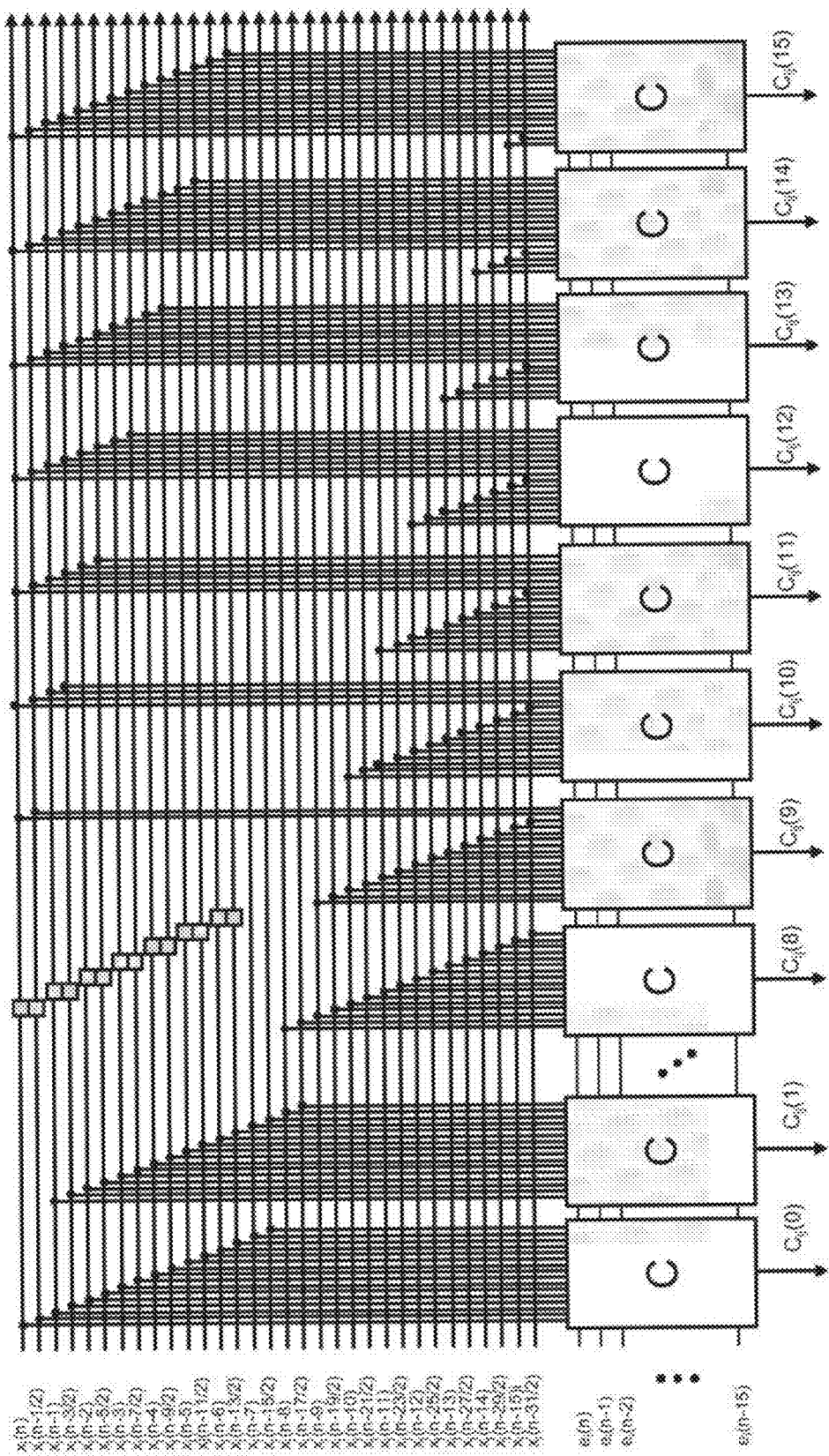

FIGS. 24-26 illustrate one implementation of an $C_{ij}(k)$ (k=0, . . . , 15) update engine. FIG. 26 shows the overall block diagram, which is instantiated 16 times (for i=0, . . . , 3 and j=0, . . . 3,). FIG. 25 is a block diagram of a single FFE coefficient update engine (block C in FIG. 26). FIG. 24 is a block diagram of an adaptation dot product engine (block A in FIG. 25).

Figure 27:
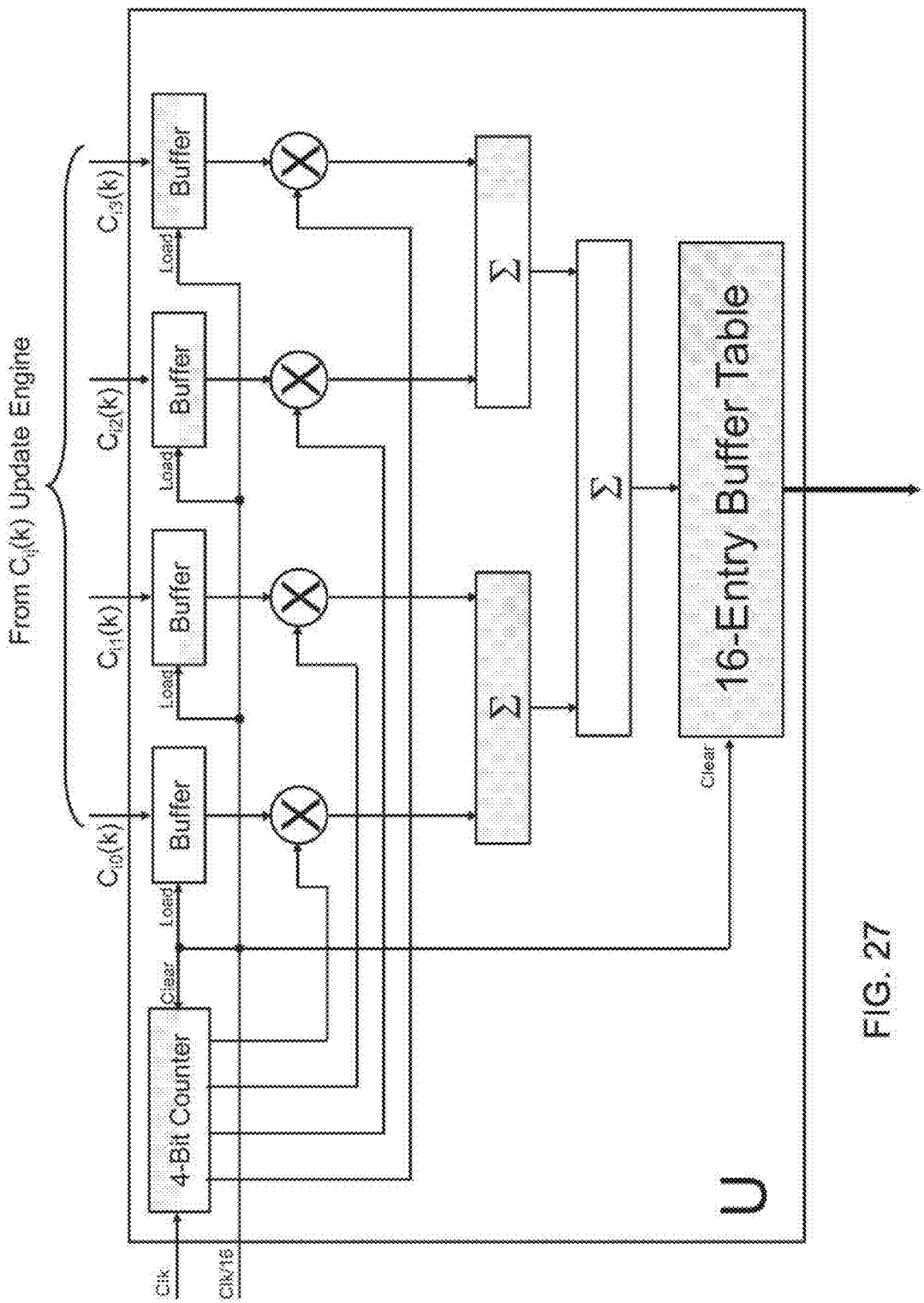
FIG. 27 is a block diagram of a lookup table refresh unit.

FIG. 27 is a block diagram of a lookup table refresh unit. This refreshes multiple entries, such as 16 entries, of each one of 96 lookup tables with identical contents in one clock cycle. There are 64 instances of this engine, corresponding to the 4 rows of each matrix coefficient of the FFE times its 16 coefficients.

Figure 28:
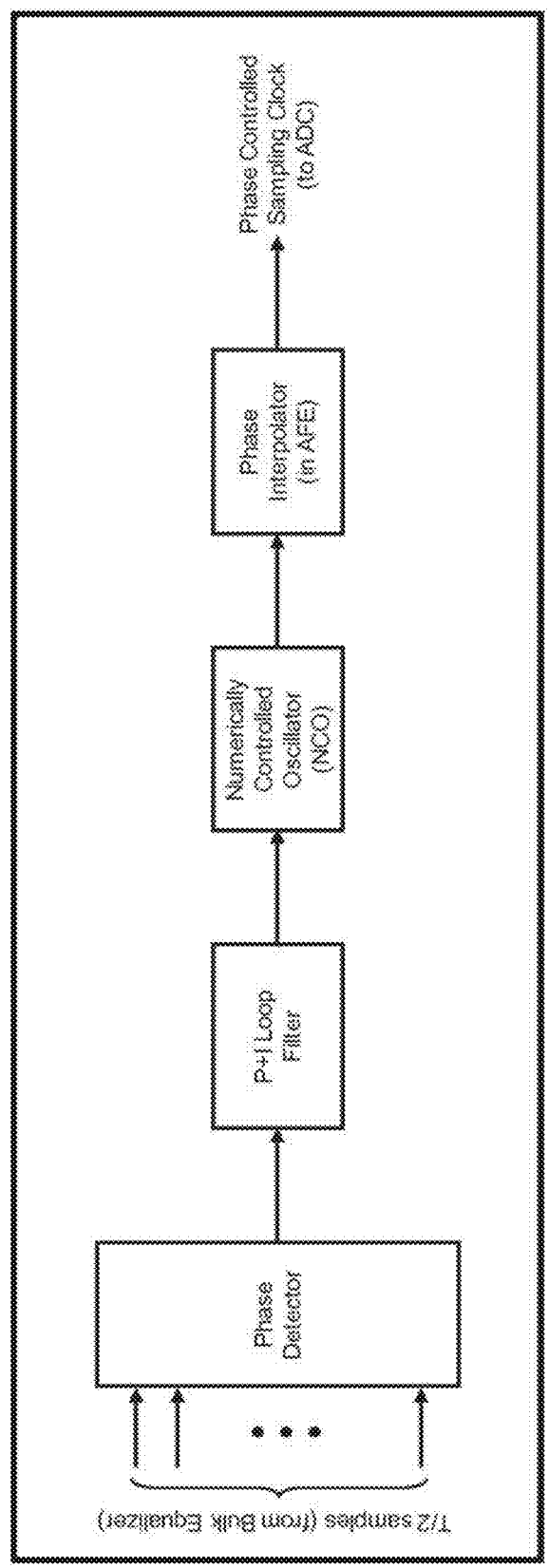
FIG. 28 is a block diagram of a timing recovery PLL.

FIGS. 28-31 relate to timing recovery. FIG. 28 is a block diagram of a timing recovery PLL. The phase detector is based on the "Wave Difference Method" (see Agazzi et al, "Timing Recovery in Digital Subscriber Loops", IEEE Transactions on Communications, June 1985, pp. 558-569), which is incorporated by reference herein in its entirety. In this method, the phase error is computed as the difference between the square magnitude of the (complex) samples of the signal taken at T/4 before and after the center of the eye. The above computation generates a nearly sinusoidal tone at the difference frequency between the local sampling clock and the clock used in the remote transmitter to transmit symbols. The phase detector seeks the zero crossings of this sinusoidal tone. The T/2 feedforward equalizer that follows interpolates the sample at the center of the eye from the samples at T/4 before and after. This method works well in the presence of intersymbol interference. To avoid excessive ISI in the input signal, the phase detector is placed at the output of the bulk equalizer.

Figure 29:
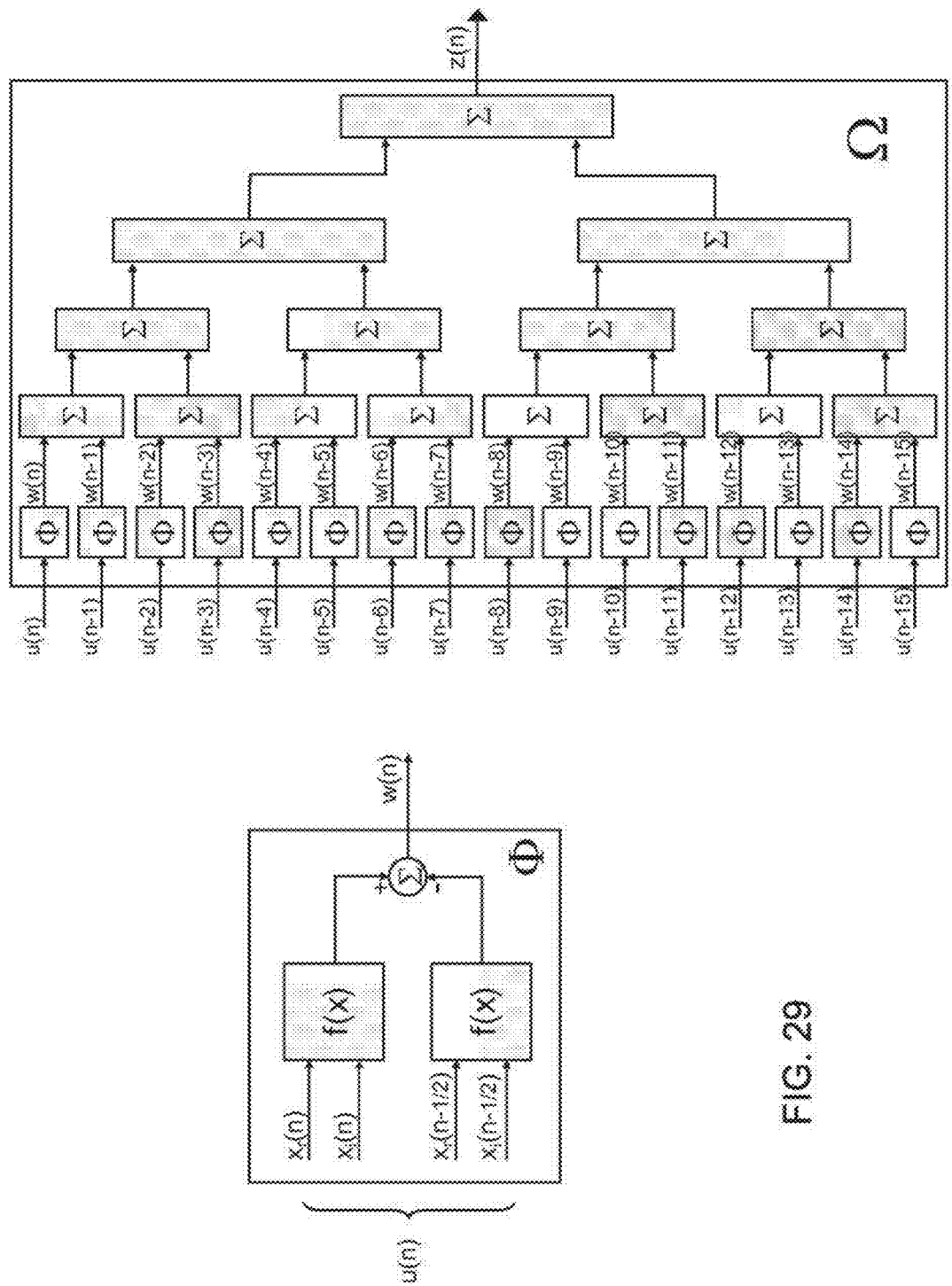
FIGS. 29-30 are block diagrams of a timing recovery phase detector.
Figure 30:
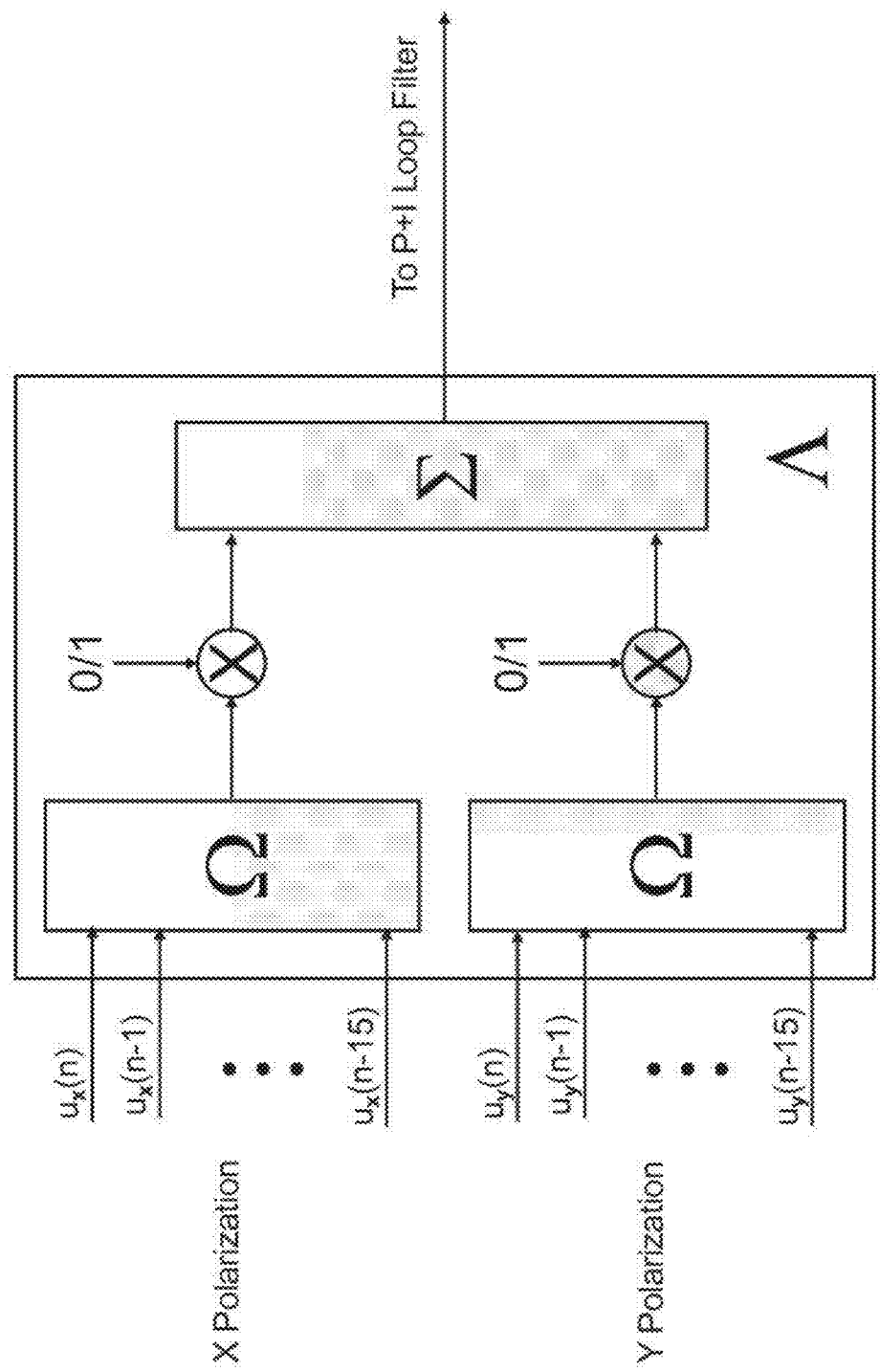

FIGS. 29-30 are block diagrams of a timing recovery phase detector. FIG. 30 shows the phase detector, including both X and Y polarizations. FIG. 29 shows more details of block Ω in FIG. 30, and also block Φ in FIG. 29. By register programming, the phase detector may operate based on the phase error information from one (selectable) or the two polarizations.

In this particular implementation, because of the latency of the parallel processing implementation of the timing recovery PLL, its capture range is limited to about 100 ppm. However, a capture range of at least +/−200 ppm is desirable. The capture range of at least +/−200 ppm can be achieved by initializing the frequency register (I register) in the P+I loop with an initial estimate of the frequency error.

Figure 31:
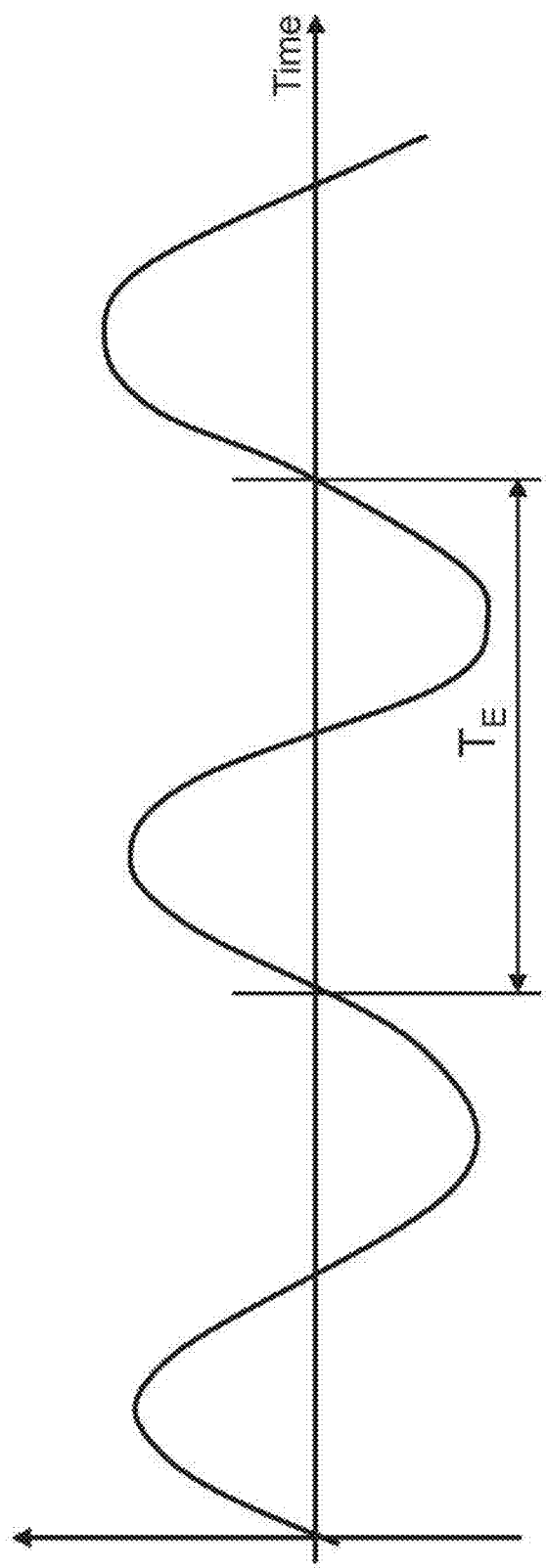
FIG. 31 is a diagram illustrating timing recovery initial frequency acquisition.

FIG. 31 is a diagram illustrating this timing recovery initial frequency acquisition. The period $T_E$ of the timing recovery phase error is a measure of the timing frequency error. By measuring $T_E$ an accurate estimate of the timing frequency error can be obtained. The estimate of the timing frequency error thus obtained is "jammed" into the frequency register (I register) in the P+I loop filter. To determine the sign of the phase error, the above procedure is repeated. A positive sign is assumed for the frequency error in the first iteration of the algorithm. If this actually doubles the frequency error instead of cancelling, the algorithm is repeated and the second estimate of frequency error is subtracted from the first.

Figure 32:
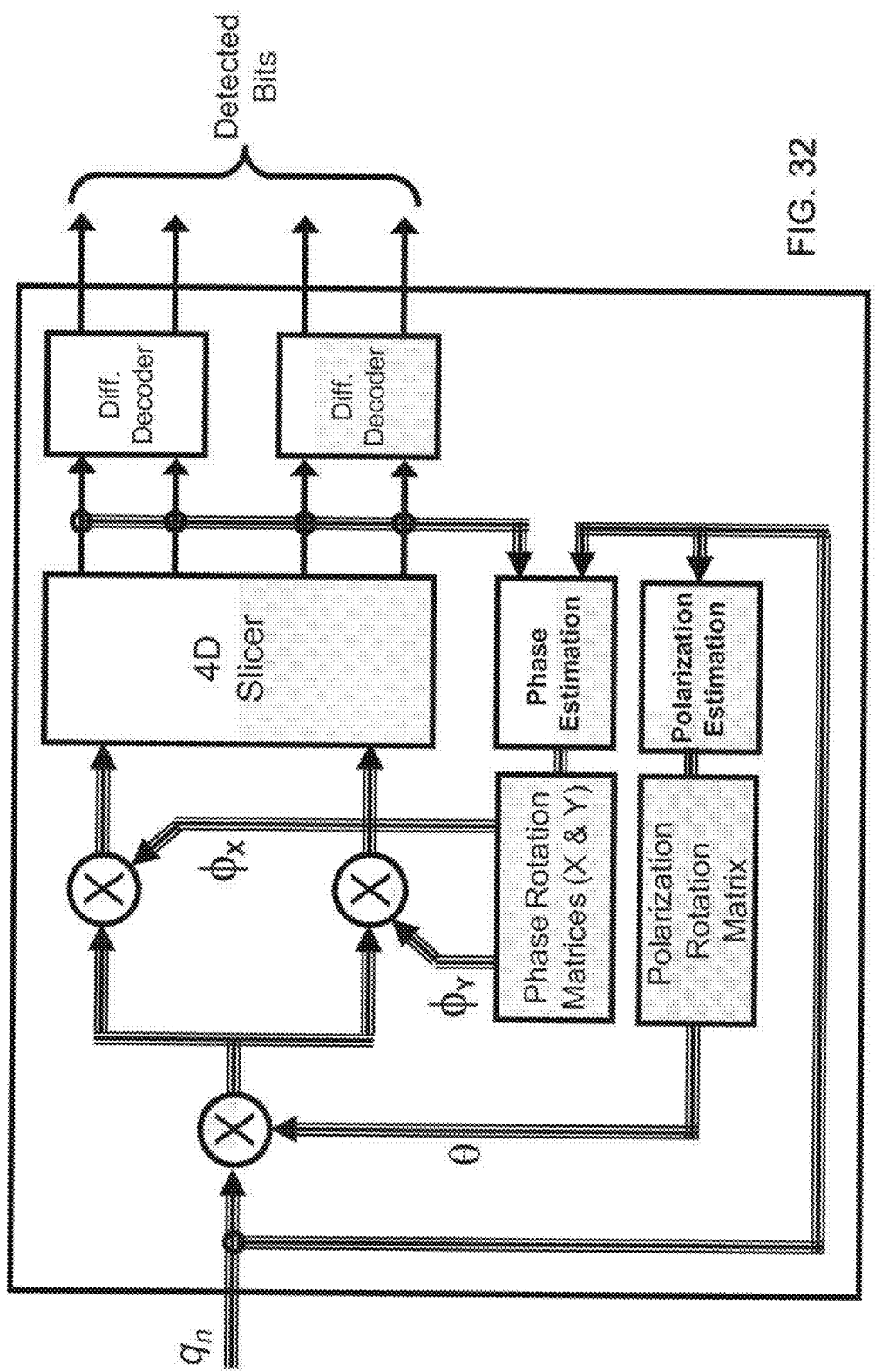
FIG. 32 is a block diagram of a carrier and polarization recovery module.
Figure 33:
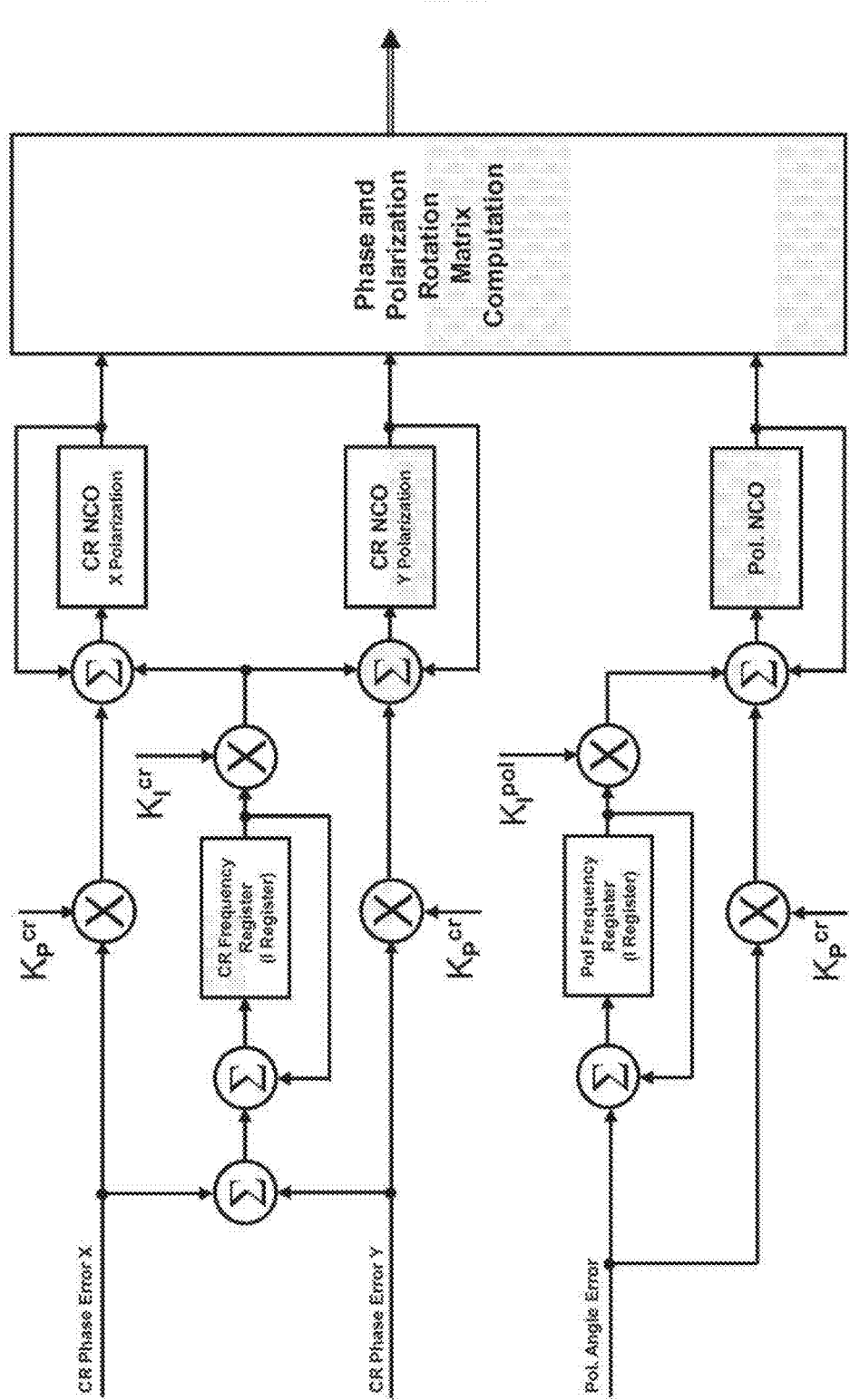
FIG. 33 is a block diagram of carrier and polarization recovery PLLs.

FIGS. 32-38 relate to carrier and polarization recovery. FIG. 32 is a block diagram of a carrier and polarization recovery module. FIG. 33 is a block diagram of carrier and polarization recovery PLLs.

Decision-directed polarization recovery techniques are based on computing a polarization angle error signal using decisions and the equalizer output. Proper alignment of phase and polarization enables correct decision to be made. Therefore, the joint convergence of three algorithms: equalization, carrier recovery, and polarization recovery enables decision-directed techniques. A polarization recovery technique that does not require decisions may be more robust.

Figure 34B:
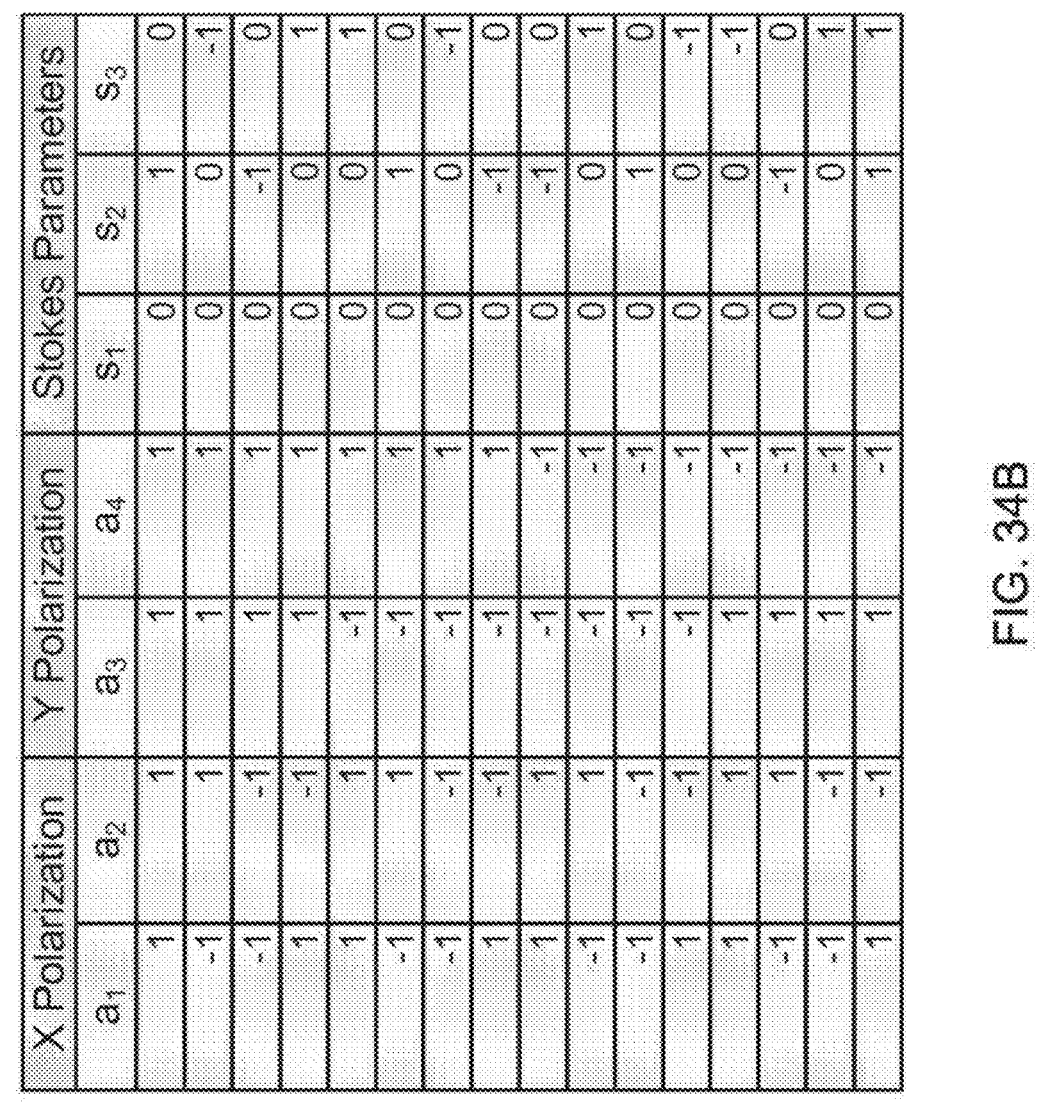

This particular example uses Stokes parameter based polarization recovery. FIG. 34A is a diagram of a Poincare sphere and Stokes parameters. FIG. 34B tabulates Stokes parameters for decision vectors. The desired polarization states lie all in the $S_1=0$ plane. For linearly polarized states it is also $S_3=0$. For linearly polarized states that do not lie in the $S_1=0$ plane, the product $e_P=S_1$ $sign(S_2)$ can be used as an error signal in a feedback loop that aligns the axes of polarization of the equalizer output with the X and Y axes. The above error signal is forced to zero for circularly or elliptically polarized states, in other words, for states such that $S_3$ is nonzero. In one approach, the error signal is forced to zero if $S_3$ is larger than a certain threshold, say 0.2 (assuming $S_0=1$ normalization).

Polarization alignment does not require that phase be aligned. On the other hand, polarization alignment facilitates decision directed carrier recovery techniques. Therefore, the preferred sequence of operations is as follows. Enable blind convergence of equalizer. After blind convergence, switch to decision-directed convergence and at the same time enable polarization recovery. After convergence of polarization recovery, enable carrier recovery. In alternate embodiment, polarization recovery is enabled in an intermediate step before enabling decision-directed operation of the equalizer.

For carrier recovery, in a parallel processing implementation, the bandwidth and the capture range of a carrier recovery PLL could be significantly reduced as a result of the latency inherent in the parallel architecture. However, these problems can be alleviated by a more elaborate design. In this example, the Least Squares Carrier Frequency Estimation and the Zero Phase Start techniques are used to alleviate the capture range problem, and the Tentative Decision Phase Error Prediction technique is used to alleviate the bandwidth reduction problem.

Figure 35:
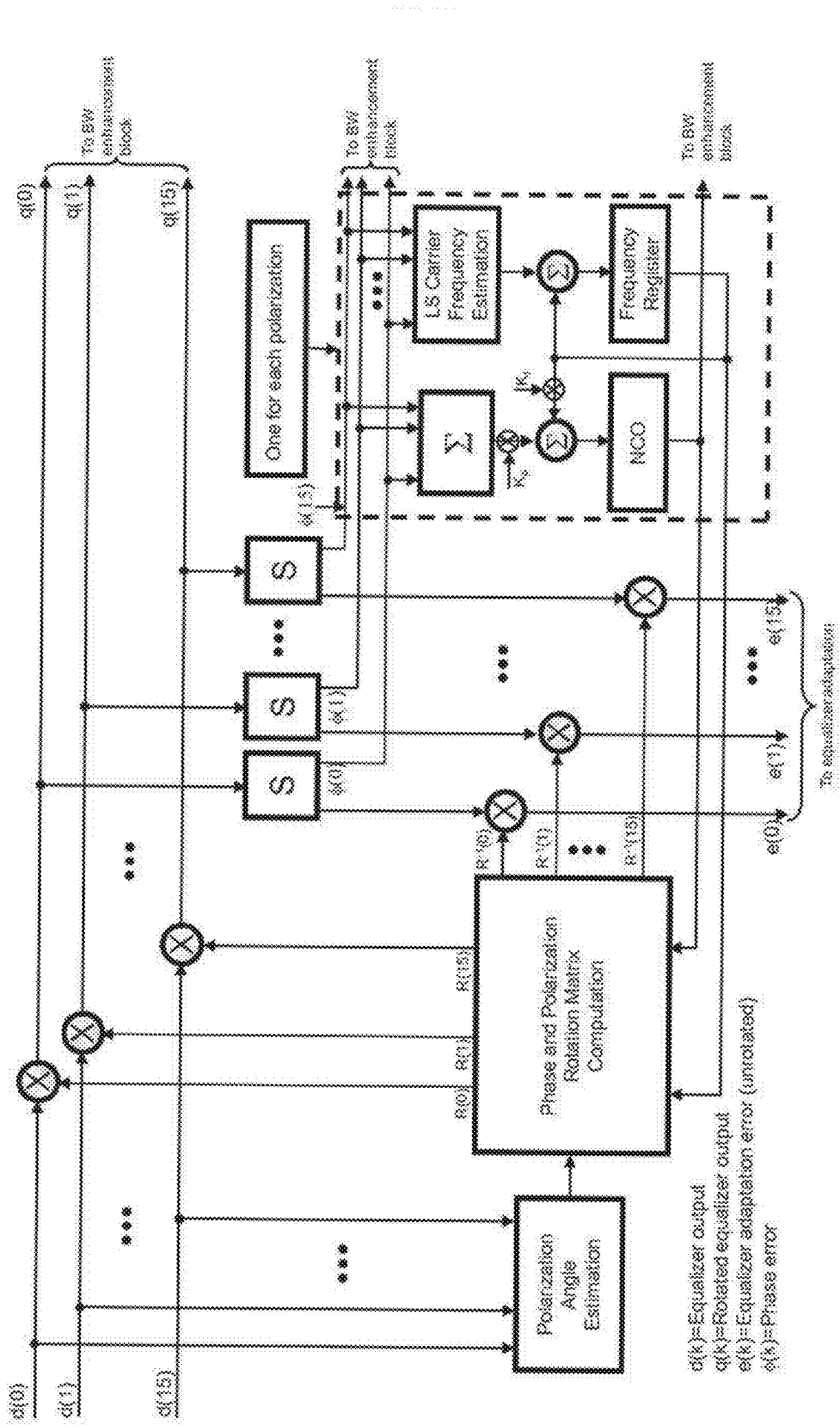
FIG. 35 is a block diagram of a parallel processing polarization and carrier recovery module.
Figure 36B:
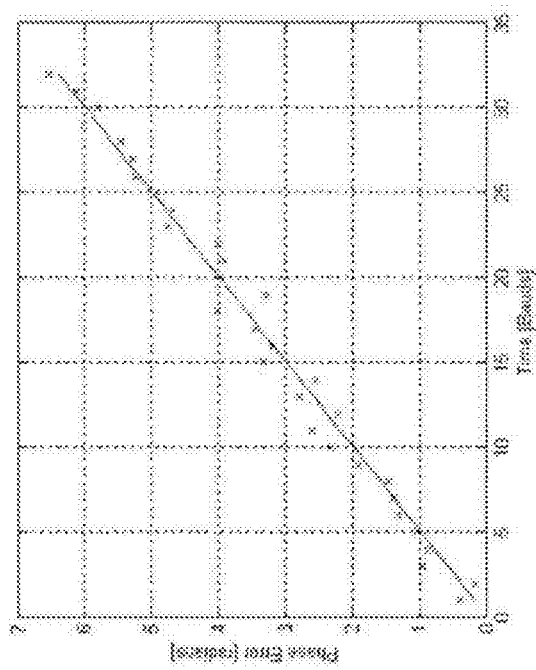
FIGS. 36A-B are diagrams illustrating least squares carrier frequency estimation.
Figure 36A:
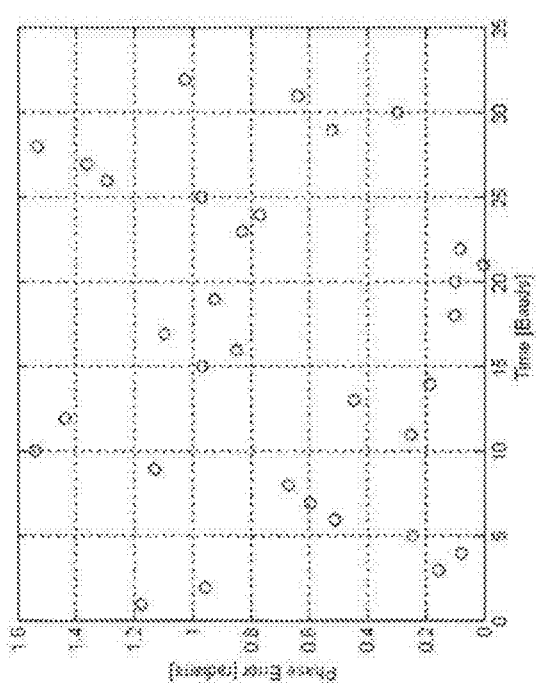
Figure 37:
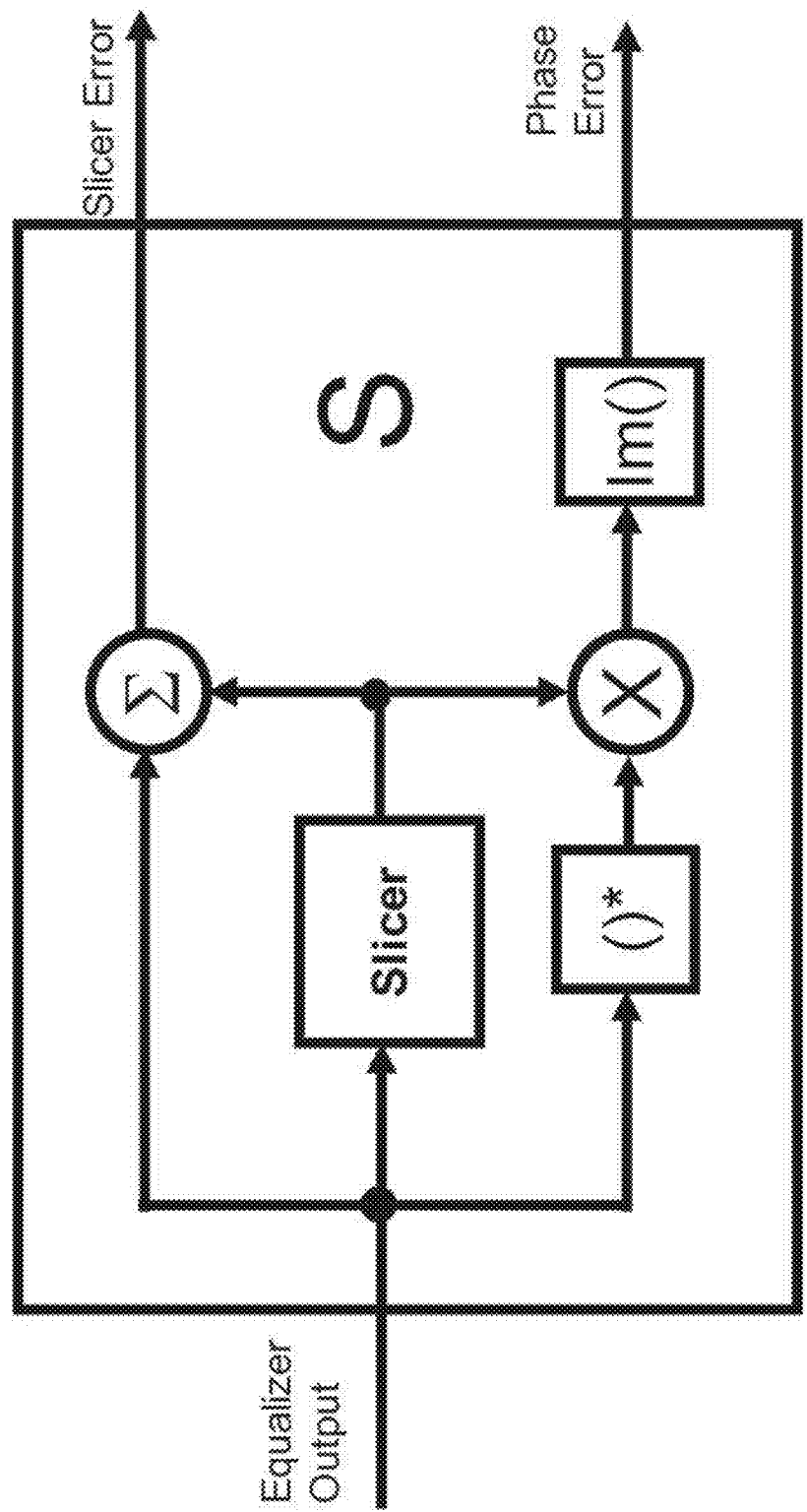
FIG. 37 is a block diagram of computation of phase error using tentative decisions.

FIGS. 35 and 37 are block diagrams of a parallel processing polarization and carrier recovery module. FIG. 35 is the high level block diagram. FIG. 37 illustrates block S in FIG. 35. FIGS. 36A-B are diagrams illustrating least squares carrier frequency estimation. In FIG. 36, the slope of least squares straight line fit to unwrapped phase error is an estimate of the carrier frequency.

In this particular example, as a result of latency, a parallel processing implementation limits the capture range of the carrier recovery PLL. To enhance the capture range, a technique based on the least squares estimator of the carrier frequency is used. During an initialization period at startup, the LS estimate of the carrier frequency is iteratively computed and added to the frequency register (I register) in the P+I loop filter until the value stored in this register accurately represents the carrier frequency. Then, in normal operation, a simplified form of the LS estimation algorithm is run, where phase unwrapping is no longer performed. The LS estimate of the carrier frequency error continues to be used to update the I register in the PLL.

FIG. 37 is a block diagram of computation of phase error using tentative decisions (block S in FIG. 35). Block S makes "tentative" decisions and uses them to compute the slicer error (used to adapt the equalizer) and the phase error (used to update the carrier recovery PLL). The decisions are "tentative" in the sense that "final" decisions will be made later with a phase error reduced by correcting the NCO output in the carrier recovery PLL using the samples of the phase error that could not be accounted before due to latency constraints.

Figure 38:
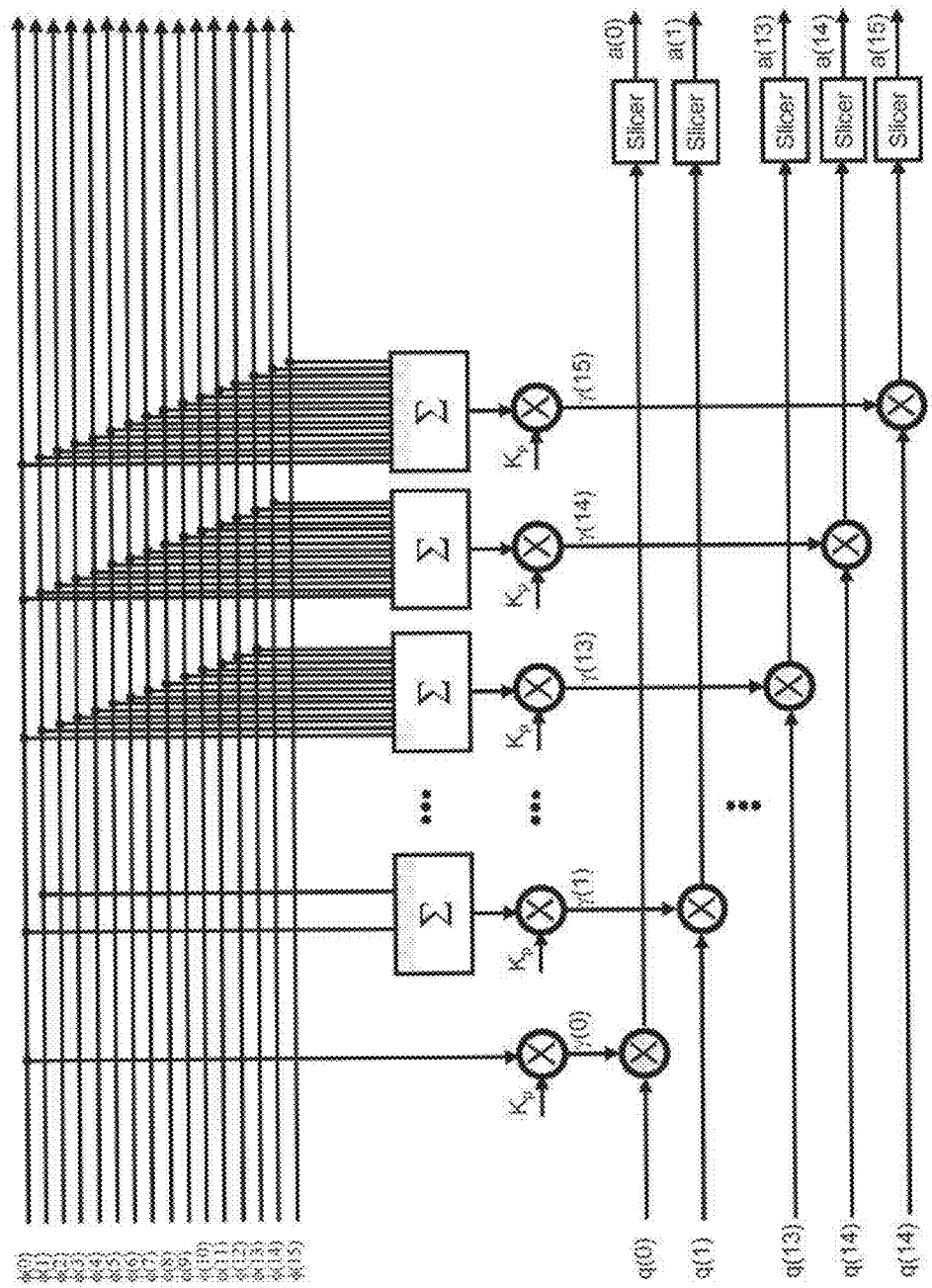
FIG. 38 is a block diagram of phase error prediction for carrier recovery bandwidth enhancement.

FIG. 38 is a block diagram of phase error prediction for carrier recovery bandwidth enhancement.

The Phase and Polarization Rotation Matrix Computation block (in FIG. 35) adds to the output of the NCO a phase rotation proportional to the interleave number and the value of the frequency register to determine the rotation angle of each interleave, thus accounting for the phase rotation generated during each symbol period as a result of the carrier frequency. The Bandwidth Enhancement block delays the samples of the equalizer output to match delays with the phase error and therefore compensate latencies. These delays are not shown in the figure.

FIG. 39 is a diagram illustrating OTU3 framing. In one embodiment, the multiplexing/demultiplexing scheme shown in FIG. 39B can be used for the serial bit stream going into the 4 channels of the 2P-QPSK transmitter/receiver. This scheme results in the 12-bit framing patterns shown in FIG. 39C transmitted on each subchannel of the 2P-QPSK channel. These patterns allow the 4 subchannels to be uniquely identified and properly aligned at the system interface (SFI 5.1 or MLD). Delays between the two polarizations arising from improper convergence of the fast equalizer can also be corrected.

An OTU3 frame detector and "subchannel aligner" can also be included. If OTU3 frames are not available in the received stream, the on-chip OTU3 frame detector can be disabled. External commands will be accepted by the receiver to control the subchannel alignment hardware.

FIG. 40 is a diagram illustrating an external framing technique. The on-chip framing block performs the operations shown, either based on an internal OTU3 framing detector as described above, or on commands issued by external hardware. The framing operations are the same regardless of whether the frame detection is internal (OTU3 based) or external. The dynamic operations are used for the framing-based coarse carrier recovery.

Figure 41:
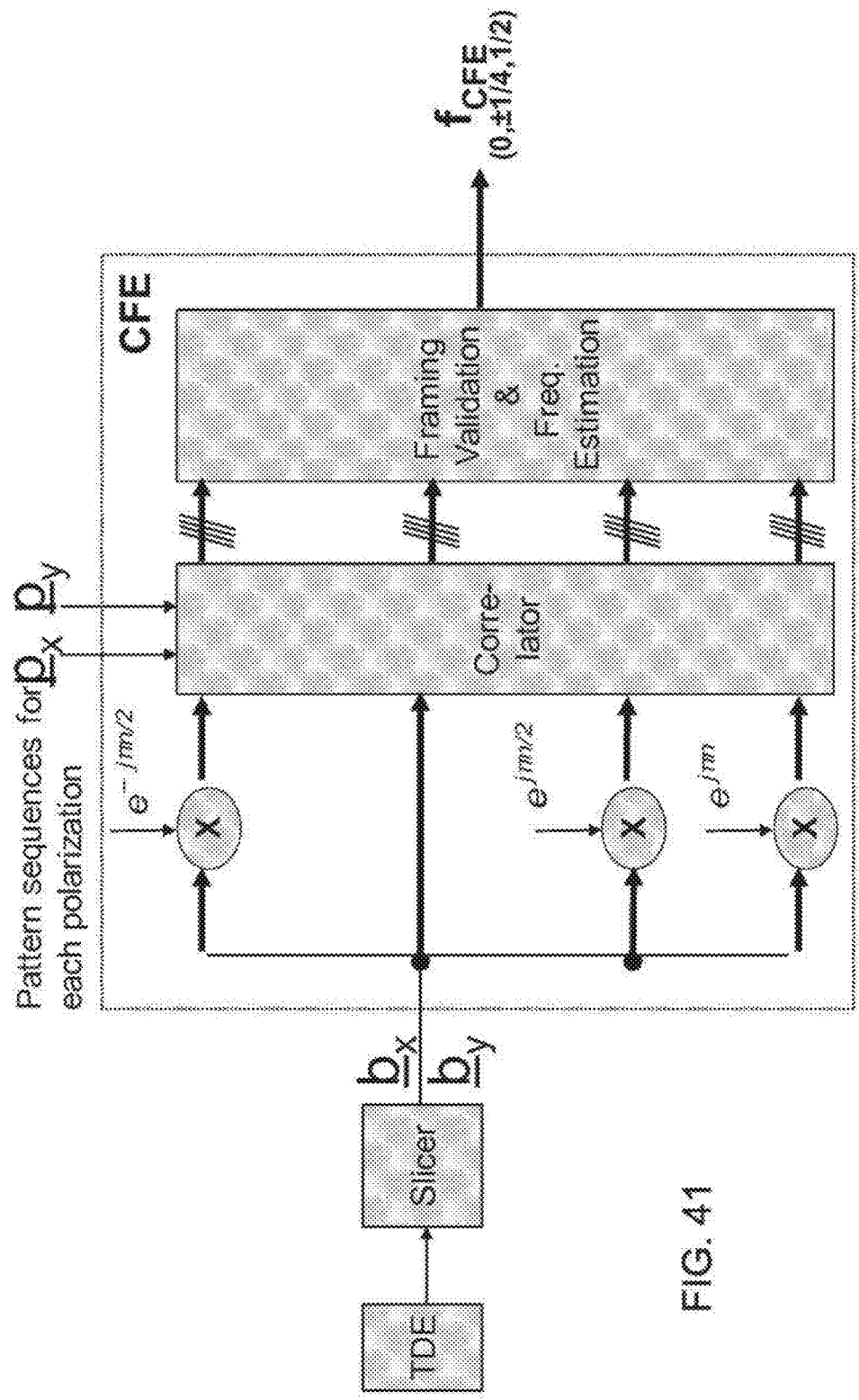
FIG. 41 is a block diagram of framing-based CCR: coarse frequency estimation.

FIG. 41 is a block diagram of framing-based CCR: coarse frequency estimation.

Figure 42:
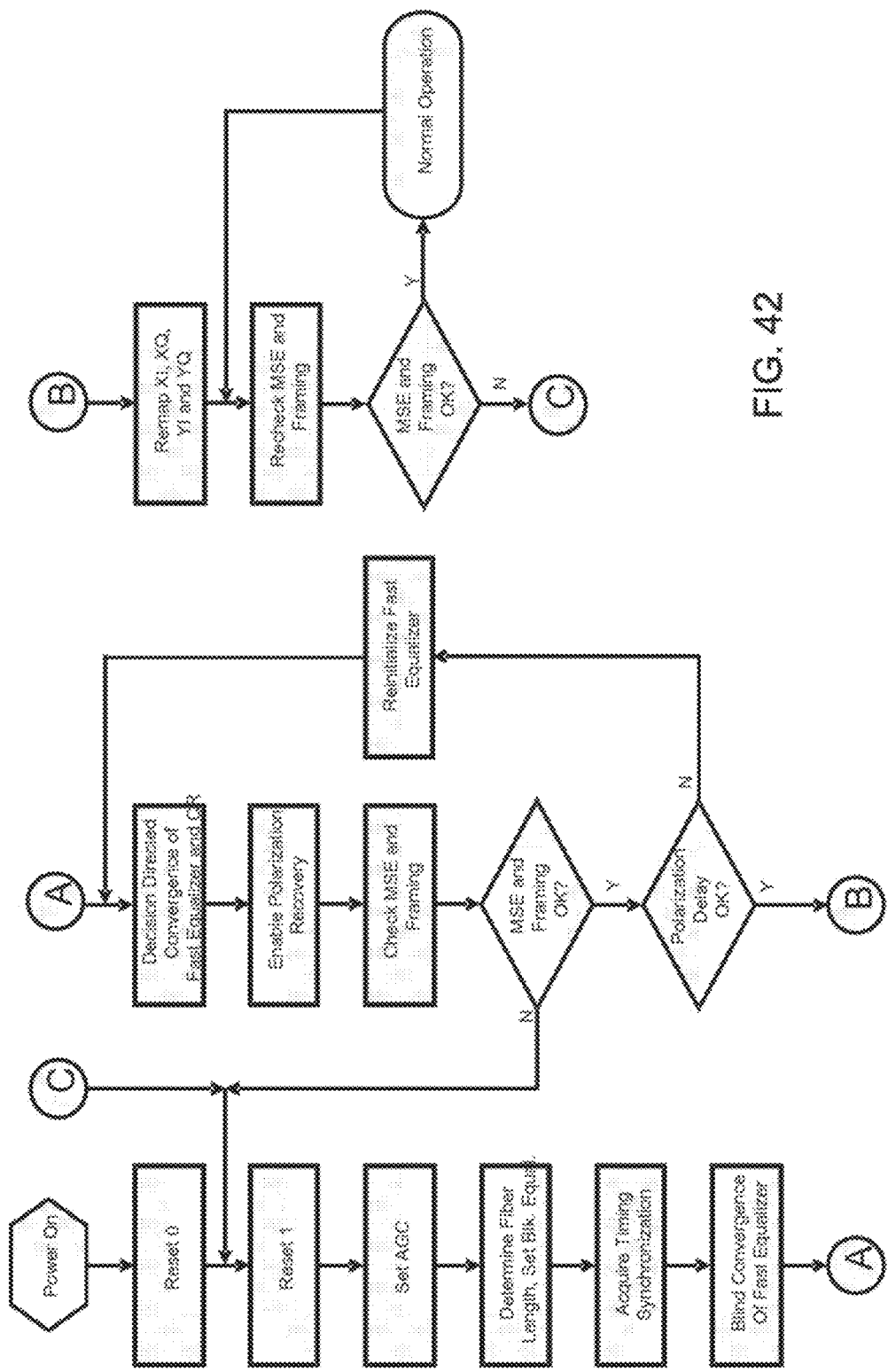
FIG. 42 is a flow diagram of a startup state machine.

FIG. 42 is a flow diagram of a startup state machine.

Although the detailed description contains many specifics, these should not be construed as limiting the scope of the invention but merely as illustrating different examples and aspects of the invention. It should be appreciated that the scope of the invention includes other embodiments not discussed in detail above. For example, the functionality has been described above as implemented primarily in electronic circuitry. This is not required, various functions can be performed by hardware, firmware, software, and/or combinations thereof. Depending on the form of the implementation, the "coupling" between different blocks may also take different forms. Dedicated circuitry can be coupled to each other by hardwiring or by accessing a common register or memory location, for example. Software "coupling" can occur by any number of ways to pass information between software components (or between software and hardware, if that is the case). The term "coupling" is meant to include all of these and is not meant to be limited to a hardwired permanent connection between two components. In addition, there may be intervening elements. For example, when two elements are described as being coupled to each other, this does not imply that the elements are directly coupled to each other nor does it preclude the use of other elements between the two. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:
1. A receiver comprising:
an optical front end to receive an optical signal comprising first data modulated onto an in-phase component of an X-polarized component of an optical carrier, second data modulated onto an in-phase component of a Y-polarized component of the optical carrier, third data modulated onto a quadrature component of the X-polarized component of the optical carrier, and fourth data modulated onto a quadrature component of the Y-polarized component of the optical carrier, and to convert the optical signal to an analog signal vector comprising an in-phase X-polarized analog component, an in-phase Y-polarized analog component, a quadrature X-polarized analog component, and a quadrature Y-polarized analog component;
an analog front end performing analog-to-digital conversion on the analog signal vector to generate a digital signal vector, the digital signal vector comprising an in-phase X-polarized digital component, a quadrature-phase X-polarized digital component, an in-phase Y-polarized digital component, and a quadrature-phase Y-polarized digital component;
a bulk chromatic dispersion equalizer applying a frequency domain equalization and producing an equalized signal vector;
a fast equalizer further equalizing the equalized signal vector by applying a filter, the fast equalizer producing a filtered signal vector;
a carrier recovery module demodulating the filtered signal vector to generate a baseband signal vector; and
a frame alignment module detecting frames of the baseband signal vector for synchronization with a framer interface, the frame alignment module to select one or more framing operations from a predefined set of framing operations and to apply the selected one or more framing operations to the baseband signal vector, the predefined set of framing operations including: swapping polarizations of X-polarized and Y-polarized digital components of the baseband signal vector, rotating a constellation of X-polarized or Y-polarized digital components of the baseband signal vector, or shifting Y-polarized digital components of the baseband signal vector by an integer multiple of a period of the baseband signal vector.

2. The receiver of claim 1, further comprising:
a demodulator calibration block between the analog front end and the bulk chromatic dispersion equalizer, the demodulator calibration block multiplying the digital signal vector from the analog front end by a matrix to rotate polarization and phase of the digital signal vector and generate a calibrated signal vector for providing to the bulk chromatic dispersion equalizer.

3. The receiver of claim 2, further comprising:
a coarse carrier recovery module estimating a carrier frequency of the calibrated signal vector and generating a carrier control signal based on the estimated carrier frequency;
wherein the calibration module calibrates the digital signal vector based on the carrier control signal.

4. The receiver of claim 2, wherein the chromatic dispersion equalizer comprises:
a transform engine transforming the calibrated signal vector to a frequency domain signal vector;
a frequency domain digital filter applied to the frequency domain signal vector; and
an inverse transform engine transforming the filtered frequency domain signal vector to a time domain signal vector.

5. The receiver of claim 4, wherein the transform engine comprises a fast Fourier transform (FFT) engine and wherein the inverse transform engine comprises an inverse fast Fourier transform (IFFT) engine.

6. The receiver of claim 1, further comprising:
a timing recovery module detecting a frequency associated with the equalized signal vector from the chromatic dispersion equalizer and generating a sampling clock,
wherein the analog front end samples the analog signal vector based on the sampling clock.

7. The receiver of claim 6, wherein the timing recovery module comprises a phase-locked loop.

8. The receiver of claim 1, further comprising:
an automatic gain control module detecting an amplitude of the digital signal vector from the analog front end and generating an amplitude control signal based on the detected amplitude.

9. The receiver of claim 8, wherein the amplitude control signal independently adjusts amplitude of different components of the analog signal vector.

10. The receiver of claim 1, wherein the carrier recovery module further comprises:
a phase estimation block for estimating a phase of the filtered signal.

11. The receiver of claim 1, wherein the carrier recovery module comprises a phase-locked loop circuit.

12. The receiver of claim 1, wherein the analog front end comprises:
a track-and-hold module sampling the analog signal vector to generate a sampled signal vector; and
an analog-to-digital converter converting the sampled signal vector to the digital signal vector.

13. The receiver of claim 1, wherein the fast equalizer comprises a coefficient update engine to update coefficients of the fast equalizer.

14. The receiver of claim 1, wherein the framer interface comprises a serial-deserializer framer interface integrated with the receiver.

15. A method for processing data received over an optical fiber, the method comprising:
receiving, by an optical front end, an optical signal comprising first data modulated onto an in-phase component of an X-polarized component of an optical carrier, second data modulated onto an in-phase component of a Y-polarized component of the optical carrier, third data modulated onto a quadrature component of the X-polarized component of the optical carrier, and fourth data modulated onto a quadrature component of the Y-polarized component of the optical carrier;
converting, by the optical front end, the optical signal to an analog signal vector comprising an in-phase X-polarized analog component, an in-phase Y-polarized analog component, a quadrature X-polarized analog component, and a quadrature Y-polarized analog component;
performing, by an analog front end, analog-to-digital conversion on the analog signal vector to generate a digital signal vector comprising an in-phase X-polarized digital component, a quadrature-phase X-polarized digital component, an in-phase Y-polarized digital component, and a quadrature-phase Y-polarized digital component;
applying, by a bulk chromatic dispersion equalizer, a frequency domain equalization to produce an equalized signal vector;
further equalizing, by a fast equalizer, the equalized signal vector by applying a filter, the fast equalizer producing a filtered signal vector;
demodulating, by a carrier recovery module, the filtered signal vector to generate a baseband signal vector; and
select, by a frame alignment module, one or more framing operations from a predefined set of framing operations, the predefined set of framing operations including: swapping polarizations of X-polarized and Y-polarized digital components of the baseband signal vector, rotating a constellation of X-polarized or Y-polarized digital components of the baseband signal vector, or shifting Y-polarized digital components of the baseband signal vector by an integer multiple of a period of the baseband signal vector; and
applying, by the frame alignment module, the selected one or more framing operations to the baseband signal vector.

16. The method of claim 15, further comprising:
prior to applying the frequency domain equalization, multiplying the digital signal vector from the analog front end by a matrix to apply a linear transformation to a polarization and phase of the digital signal vector and generate a calibrated signal vector.

17. The method of claim 16, further comprising:
detecting a frequency associated with the equalized signal vector from the chromatic dispersion equalizer and generating a sampling clock; and
sampling the analog signal vector based on the sampling clock.

18. A transceiver comprising:
a transmitter including:
a serializer for receiving transmit data from a transmit data source;
a laser source to produce an optical carrier;
a modulator to modulate to modulate the transmit data onto the optical carrier; and
a receiver including:
an optical front end to receive an optical signal comprising first data modulated onto an in-phase component of an X-polarized component of an optical carrier, second data modulated onto an in-phase component of a Y-polarized component of the optical carrier, third data modulated onto a quadrature component of the X-polarized component of the optical carrier, and fourth data modulated onto a quadrature component of the Y-polarized component of the optical carrier, and to convert the optical signal to an analog signal vector comprising an in-phase X-polarized analog component, an in-phase Y-polarized analog component, a quadrature X-polarized analog component, and a quadrature Y-polarized analog component;

an analog front end performing analog-to-digital conversion on the analog signal vector to generate a digital signal vector, the digital signal vector comprising an in-phase X-polarized digital component, a quadrature-phase X-polarized digital component, an in-phase Y-polarized digital component, and a quadrature-phase Y-polarized digital component;

a bulk chromatic dispersion equalizer applying a frequency domain equalization and producing an equalized signal vector;

a fast equalizer further equalizing the equalized signal vector by applying a filter, the fast equalizer producing a filtered signal vector;

a carrier recovery module demodulating the filtered signal vector to generate a baseband signal vector; and a frame alignment module detecting frames of the baseband signal vector for synchronization with a framer interface, the frame alignment module to select one or more framing operations from a predefined set of framing operations and to apply the selected one or more framing operations to the baseband signal vector, the predefined set of framing operations including: swapping polarizations of X-polarized and Y-polarized digital components of the baseband signal vector, rotating a constellation of X-polarized or Y-polarized digital components of the baseband signal vector, or shifting Y-polarized digital components of the baseband signal vector by an integer multiple of a period of the baseband signal vector.

19. The transceiver of claim 18, further comprising:
a demodulator calibration block between the analog front end and the bulk chromatic dispersion equalizer, the demodulator calibration block multiplying the digital signal vector from the analog front end by a matrix to rotate polarization and phase of the digital signal vector and generate a calibrated signal vector for providing to the bulk chromatic dispersion equalizer.

20. The transceiver of claim 19, further comprising:
a coarse carrier recovery module estimating a carrier frequency of the calibrated signal vector and generating a carrier control signal based on the estimated carrier frequency;
wherein the calibration module calibrates the digital signal vector based on the carrier control signal.

* * * * *